(12) United States Patent
Kurisawa et al.

(10) Patent No.: US 11,949,076 B2
(45) Date of Patent: Apr. 2, 2024

(54) MAINTENANCE SUPPORT METHOD, MAINTENANCE SUPPORT SYSTEM, MAINTENANCE SUPPORT DEVICE, AND COMPUTER PROGRAM

(71) Applicant: GS Yuasa International Ltd., Kyoto (JP)

(72) Inventors: Isamu Kurisawa, Kyoto (JP); Hirofumi Imaizumi, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 178 days.

(21) Appl. No.: 17/621,056

(22) PCT Filed: Jun. 17, 2020

(86) PCT No.: PCT/JP2020/023664
§ 371 (c)(1),
(2) Date: Dec. 20, 2021

(87) PCT Pub. No.: WO2020/255980
PCT Pub. Date: Dec. 24, 2020

(65) Prior Publication Data
US 2022/0367924 A1 Nov. 17, 2022

(30) Foreign Application Priority Data

Jun. 20, 2019 (JP) .................. 2019-114663
Jun. 20, 2019 (JP) .................. 2019-114664
Jun. 20, 2019 (JP) .................. 2019-114665

(51) Int. Cl.
*H01M 10/42* (2006.01)
*H01M 10/48* (2006.01)

(52) U.S. Cl.
CPC ......... *H01M 10/425* (2013.01); *H01M 10/48* (2013.01); *H01M 2010/4271* (2013.01); *H01M 2010/4278* (2013.01)

(58) Field of Classification Search
None
See application file for complete search history.

(56) References Cited

U.S. PATENT DOCUMENTS 10,306,844 B1 *  6/2019  Levine ............... G05B 15/02
2018/0351401 A1 * 12/2018  Binder ............... H02J 13/00
2019/0064788 A1    2/2019  Komatsuda et al.

FOREIGN PATENT DOCUMENTS

CN    109800127 A    5/2019
EP    2295997 B1    11/2018
(Continued)

OTHER PUBLICATIONS

International Searching Authority, International Search Report and Written Opinion for International Application No. PCT/JP2020/023664, dated Sep. 1, 2020, (14 pages), Japan Patent Office, Tokyo, Japan.

*Primary Examiner* — Roy Y Yi
(74) *Attorney, Agent, or Firm* — Alston & Bird LLP

(57) ABSTRACT

This maintenance assistance method detects a sign of abnormality of a power storage element on the basis of measurement data pertaining to the power storage element, which is sequentially stored in a storage device, determines at least any among a work period of a maintenance work corresponding to the detected sign of abnormality, the number of workers, and an article including a replacement or a tool required for the maintenance work, and notifies the workers of the maintenance work of execution of the maintenance work corresponding to the determined item.

7 Claims, 24 Drawing Sheets

(56) References Cited

FOREIGN PATENT DOCUMENTS

| | | |
|---|---|---|
| JP | H06-242281 A | 9/1994 |
| JP | 2001-338042 A | 12/2001 |
| JP | 2002-157361 A | 5/2002 |
| JP | 2002-324109 A | 11/2002 |
| JP | 2003-123847 A | 4/2003 |
| JP | 2010-206985 A | 9/2010 |
| JP | 2011-175494 A | 9/2011 |
| JP | 2015-040775 A | 3/2015 |
| JP | 2018-045844 A | 3/2018 |
| JP | 6402925 B2 | 10/2018 |
| JP | 2018-173793 A | 11/2018 |
| JP | 2019-040536 A | 3/2019 |
| WO | WO-2009/156533 A1 | 12/2009 |
| WO | WO-2019/023687 A2 | 1/2019 |

\* cited by examiner

Trouble shooting

ID of person in charge : T00010987 (Tokkyo Taro)

Customer ID : 0012345  Customer location : X factory UPS
Serial number : 103456789  Apparatus model : UP******
Apparatus delivery date : 2010/9/1
Inspection implementation date : 2018/9/1

Please acquire data below from maintenance device

Storage battery capacity [ ]
Number of cells [ ]
Voltage value maximum [ ]
Voltage value minimum [ ]    [ Transmit ]

MAINTENANCE SUPPORT METHOD, MAINTENANCE SUPPORT SYSTEM, MAINTENANCE SUPPORT DEVICE, AND COMPUTER PROGRAM

CROSS REFERENCE TO RELATED APPLICATIONS

This application is a national stage application, filed under 35 U.S.C. § 371, of International Application No. PCT/JP2020/023664, filed Jun. 17, 2020, which international application claims priority to and the benefit of Japanese Applications Nos. 2019-114663; 2019-114664; and 2019-114665, all three filed Jun. 20, 2019; the contents of all of which as are hereby incorporated by reference in their entireties.

BACKGROUND

Technical Field

The present invention relates to a maintenance support method, a maintenance support system, a maintenance support device, and a computer program for supporting maintenance and management work of an energy storage device.

Description of Related Art

An energy storage device is widely used in a device connected to a renewable energy source such as solar power generation or wind power generation, an uninterruptible power system, a DC or AC power supply device included in a stabilizing power supply, and the like. The energy storage device is used as a backup power supply when there is a trouble in power supply from a power generating system. Because a trouble in power supply greatly affects social activities, it is very important to stabilize power supply using the energy storage device.

The energy storage device used as a backup power supply is in a standby state when power supply from a power generating system is normal, that is, in a case where no disaster or trouble of a power system has occurred. Even if the energy storage device is in a standby state and is not charged or discharged, the energy storage device is deteriorated little by little from a point of time when the energy storage device is manufactured, and there is a possibility that the energy storage device cannot be appropriately charged or discharged when the energy storage device needs to be actually operated. Depending on an individual characteristic and a use environment of the energy storage device, there is a possibility that performance, assumed at the time of manufacturing, cannot be exhibited.

Patent Document JP-A-2010-206985 discloses a monitoring control device that, in a case where an abnormal situation occurs in a power system, can automatically create a report including information obtained by capturing a progress to reduce a burden on an operator of the power system, and allow verification of the report for appropriate measures. Patent Document JP 6402925 discloses an apparatus in which a maintenance worker can acquire state data of an energy storage device, at the time of periodic inspection of the energy storage device, without going through a network managed by a user of the energy storage device. According to the method disclosed in Patent Document 2, a maintenance worker can visit an installation place of the energy storage device and easily acquire state data of the energy storage device using a terminal device possessed by the maintenance worker.

BRIEF SUMMARY

For an energy storage device, it is essential to perform maintenance and inspection including observation of the progress of deterioration, and to perform preventive maintenance such as appropriate replacement in a case where the deterioration progresses more than an assumed model. When an abnormality of the energy storage device is found at the time of maintenance and inspection, or when an abnormality is automatically detected by a monitoring control device, the energy storage device is forced to be stopped during verification of the abnormality, checking of repair execution with a customer based on a verification result, arrangement of repair, and actual repair work for returning the energy storage device to a normal state. In order not to cause a trouble in social activities, power supply is required to be in a constantly stable state for 24 hours and 365 days, and the energy storage device in a standby state is also required to have a stop period that is as short as possible or kept to zero if possible.

In order to shorten the stop period, it is expected to prevent a trouble by frequent maintenance and inspection. However, a large amount of human resources are required to frequently perform maintenance and inspection, and thus it is difficult to realize frequent maintenance and inspection. It is necessary to reduce a load on a maintenance worker, to realize efficient and reliable maintenance of a system including an energy storage device, and to stably supply power even when an event occurs which is difficult to predict.

An object of the present invention is to provide a maintenance support method, a maintenance support system, a maintenance support device, and a computer program for stably operating a system including an energy storage device.

A maintenance support method according to an aspect of the present disclosure includes detecting a sign of an abnormality of an energy storage device based on measurement data which is relating to the energy storage device and is sequentially stored in a storage device, determining at least one of a work period of maintenance work corresponding to a detected sign of an abnormality, number of workers, and an item including a replacement or a tool necessary for the maintenance work, and notifying a worker of the maintenance work of implementation of maintenance work corresponding to a determined matter.

BRIEF DESCRIPTION OF THE FIGURES

FIG. 12 illustrates a content example of the repair support screen displayed on the maintenance terminal device.

DETAILED DESCRIPTION OF VARIOUS EMBODIMENTS

Figure 1:
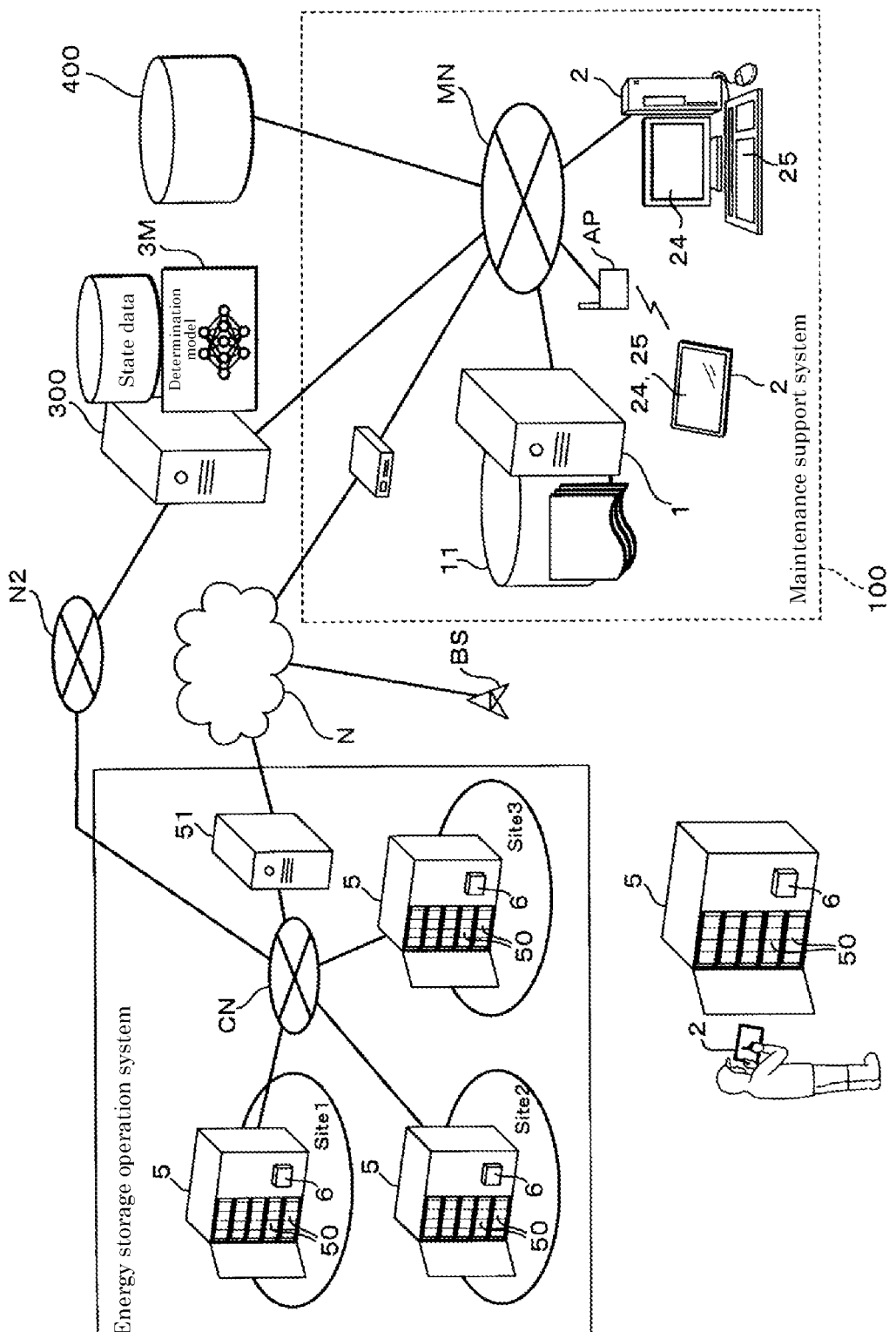
FIG. 1 illustrates an outline of a maintenance support system.

A maintenance support method includes detecting a sign of an abnormality of an energy storage device based on measurement data which is relating to the energy storage device and is sequentially stored in a storage device, determining at least one of a work period of maintenance work corresponding to a detected sign of an abnormality, number of workers, and an item including a replacement or a tool necessary for the maintenance work, and notifying a worker of the maintenance work of implementation of maintenance work corresponding to a determined matter.

With the above configuration, since a sign of an abnormality is automatically detected based on stored measurement data, the burden on a maintenance worker is reduced. As measurement data is sequentially stored, it is now possible to perform detection at the stage of a sign of an abnormality and to determine necessary maintenance work by a computer using the measurement data. As compared with a case where a maintenance worker actually inspects an energy storage device, after the abnormality appears, to investigate a cause, time required for investigating the cause can be shortened, and a stop period of the apparatus including the energy storage device can be shortened.

In a case where the energy storage device includes a plurality of energy storage devices, the detection of a sign of an abnormality is performed for each of the energy storage devices or a group of the energy storage devices. For the energy storage device or the energy storage device group in which the sign is detected, a work period, the number of workers or an item, a worker, and implementation date and time are determined so that operation of other energy storage devices can be continued.

In a case where a plurality of energy storage devices are included, it is possible to take a measure such that operation as a whole is continued even if an abnormality occurs in some of the energy storage devices. With the above configuration, the operation is continued in other energy storage devices in which the sign of an abnormality is not detected, and a constantly stable state for 24 hours and 365 days can be maintained.

A determination model learned so as to output a score corresponding to whether or not measurement data of a non-conforming energy storage device is included in measurement data measured for each of the energy storage devices or an energy storage device group including a plurality of the energy storage devices in a case where the measurement data is input may be used. In a case where it is determined, based on the score output by the determination model, that measurement data of a non-conforming energy storage device is included, the non-conformity is determined, and a sign of an abnormality of the energy storage device is detected based on the determined non-conformity.

With the above configuration, it is possible to detect an abnormality sign more accurately and more quickly than analysis of measurement data manually performed by a person. By using the non-conformity and setting a non-conforming energy storage device that does not match an assumed model at the time of manufacturing as a factor of an abnormality, energy storage devices as a whole can be matched with the assumed model, and improvement in accuracy in abnormality detection and life prediction can be expected.

The maintenance support method may include processing of creating time distribution of scores output from the determination model in response to input of measurement data of the energy storage device group, and determining non-conformity by distinguishing urgency based on created time distribution.

With the above configuration, it is possible to determine non-conformity by distinguishing whether or not it is urgent according to a change in a score of non-conformity with respect to time, and to efficiently implement maintenance work according to the urgency.

The maintenance support method may include processing of using an image determination model learned so as to output a score corresponding to whether or not measurement data of a non-conforming energy storage device is included in measurement data of an energy storage device or an energy storage device group corresponding to created time distribution in a case where an image obtained by imaging the time distribution is input, imaging created time distribution and inputting the imaged time distribution to the image determination model, and determining non-conformity of the energy storage device group based on a score output from the image determination model.

With the above configuration, it is possible to detect an abnormality sign and determine non-conformity more accurately and more quickly than analysis of measurement data manually performed by a person. The possibility of determining non-conformity enables quick maintenance work based on accurate preparation.

The maintenance support method may include processing of determining a worker and implementation date and time of the maintenance work based on a list of workers who can perform the maintenance work and schedule data of each of the workers, and notifying the determined worker of implementation of the maintenance work.

With the above configuration, a worker who can perform work in a necessary work period is automatically determined by the schedule data. Allocation of work on an appropriate schedule is realized.

The maintenance support method may receive an implementation approval for the maintenance work from an owner of the energy storage device, and notify implementation of the maintenance work in a case where the implementation approval is received.

In this manner, the maintenance work can be smoothly implemented with the agreement of an owner of an energy storage device. Depending on content of an abnormality of an energy storage device and content of maintenance work, the owner can choose not to agree.

The maintenance support method may determine implementation date and time based on operation information of an apparatus obtained from the owner in a case where the implementation approval is received.

Since actual implementation date and time is determined based on operation information of an apparatus, an owner can make a selection that allows implementation of maintenance work while operation of an apparatus including an energy storage device is continued.

In a case where the implementation approval is received, an item necessary for the maintenance work may be automatically ordered to a seller of the item. The worker is notified of identification data of the ordered item.

With the above configuration, order work is also automatically performed, and the burden on a maintenance worker or a sales representative can be reduced.

Estimate data of the maintenance work may be created based on determined work period, number of workers, and necessary item, and the implementation approval may be received based on the estimate data.

With the above configuration, the burden on a maintenance worker or a sales representative can be reduced also for estimate creation work. It is possible to smoothly hold a meeting with a customer about implementation of maintenance and inspection.

The energy storage device may be an energy storage device included in an uninterruptible power system. With the above configuration, maintenance and inspection for preventing a trouble in an energy storage device used as a backup power source is efficiently and reliably performed. This can contribute to constant stabilization of power supply. The uninterruptible power system is used for backup during power failure. Since a situation in which backup cannot be made when a power failure occurs is not allowed, it is very important to detect a sign of an abnormality to prevent a trouble.

The maintenance support method can be implemented by a system including a plurality of apparatuses. A maintenance support system includes a storage device that periodically acquires and sequentially stores measurement data relating to an energy storage device, a maintenance terminal device that can be connected to the storage device, and a maintenance support device to which communication connection can be established from the maintenance terminal device. The maintenance support device determines at least one of a work period of maintenance work relating to a detected abnormality or sign of an abnormality, number of workers, and an item including a replacement or a tool necessary for the maintenance work in a case where an abnormality or a sign of an abnormality of the energy storage device is detected based on measurement data relating to the energy storage device, and transmits an implementation instruction including a determined matter to a worker of the maintenance work.

A maintenance support device includes a determination unit that determines at least one of a work period of maintenance work relating to a detected abnormality or sign of an abnormality, number of workers, and an item including a replacement or a tool necessary for the maintenance work in a case where an abnormality or a sign of an abnormality of an energy storage device is detected based on measurement data which is relating to the energy storage device and is sequentially stored in a storage device in association with identification data for identifying the energy storage device, and a transmission unit that transmits an implementation instruction including a determined matter to a worker of the maintenance work.

The maintenance support method may be realized as a computer program. This computer program causes a computer to execute processing of detecting a sign of an abnormality of an energy storage device based on measurement data which is relating to the energy storage device and is sequentially stored in a storage device in association with identification data for identifying the energy storage device, determining at least one of a work period of maintenance work corresponding to a detected sign of an abnormality, number of workers, and an item including a replacement or a tool necessary for the maintenance work, and notifying a worker of the maintenance work of implementation of maintenance work corresponding to a determined matter.

Hereinafter, the present invention will be specifically described with reference to the drawings illustrating an embodiment of the present invention.

First Embodiment

FIG. 1 illustrates an outline of a maintenance support system 100. The maintenance support system 100 includes a maintenance support device 1 and a maintenance terminal device 2 used by a maintenance worker. The maintenance support system 100 is communicably connectable to a remote monitoring system 300 that collects data indicating a state of an energy storage device 50 to be maintained and realizes remote state browsing based on data collected via a network. The maintenance support system 100 is communicably connectable to a customer data management system 400 that stores data of a customer who purchases an energy storage device to be maintained. In the present embodiment, the maintenance support system 100, the remote monitoring system 300, and the customer data management system 400 are managed by a manufacturer of the energy storage device 50 to be maintained, and can be communicably connected to each other via a network MN or a dedicated line for the manufacturer. The maintenance support system 100 may be communicably connectable to a manufacturing management system (not illustrated) of the energy storage device 50.

The network MN is a local network for a manufacturer. The network MN is, for example, Ethernet (registered trademark) and may be an optical line. The network MN may include a virtual private network (VPN), and connect the systems 100, 300, and 400 in different locations as a local network. Connection between the maintenance support system 100 and the remote monitoring system 300 and connection between the maintenance support system 100 and the customer data management system 400 may be a part of the network MN, a dedicated line, or a VPN.

The maintenance terminal device 2 and the maintenance support device 1 can be communicably connected via a communication network N or the network MN. The communication network N is what is called the Internet. The communication network N may include a carrier network that realizes wireless communication according to a predetermined mobile communication standard. The communication network N may include a general optical line.

The customer data management system 400 stores attribute data such as a name or a name of a customer, a contact address of the customer, and an address in association with a customer ID. When a customer installs and manages a plurality of energy storage apparatuses 5 in different locations, the customer data management system 400 stores sites in association with location IDs for identifying the locations. The customer data management system 400 stores a serial number of the energy storage device 50 purchased by a customer in association with the customer ID. In a case where a customer installs and manages a plurality of the energy storage apparatuses 5 in different locations, the customer data management system 400 stores a serial number of the installed energy storage device 50 in association with the customer ID and the location ID.

The remote monitoring system 300 sequentially stores state data of the energy storage device 50 in association with a serial number of the energy storage device 50. The remote monitoring system 300 includes a determination model 3M that outputs a score relating to an abnormality sign in a case where state data of the energy storage device 50 is input, and determines whether or not there is a sign of an abnormality sign with respect to the energy storage device 50. The remote monitoring system 300 may derive, for each of the energy storage devices 50, diagnostic data including a state of charge (SOC), a state of health (SOH), an estimated life, and the like of each of the energy storage devices 50 based on the state data.

The manufacturing management system preferably stores a lot number at the time of manufacturing and shipping date and time in association with a serial number of the energy storage device 50.

The energy storage device 50 to be maintained by the maintenance support system 100 is preferably a rechargeable energy storage device such as a secondary battery including a lead-acid battery and a lithium ion battery or a capacitor. A part of the energy storage device 50 may be a non-rechargeable primary battery. Each of the energy storage devices 50 in the present embodiment is a lead-acid battery. In another example, the energy storage device 50 is an energy storage module in which a plurality of energy storage cells are connected. In another example, the energy storage device 50 is an energy storage cell itself or an energy storage module group in which a plurality of energy storage modules are connected.

The energy storage apparatus 5 includes one or a plurality of the energy storage devices 50. In one example, the energy storage apparatus 5 is used alone. In another example, the energy storage apparatus 5 is used as a group of the energy storage apparatuses 5 communicably connected to a network CN of a customer managed by a customer (user) of the energy storage device 50. A group of the energy storage apparatuses 5 managed by the same customer transmit state data of the energy storage device 50 to a management apparatus 51 managed by the customer via the network CN of the customer. The state data includes at least a voltage value, and may include an internal resistance value, a current value, and a temperature. The state data is transmitted from a unit connected to a terminal of the energy storage device 50 which is a lead-acid battery via a maintenance communication device 6. In another example, the state data may be transmitted by the maintenance communication device 6 connected to a battery management device (BMU) included in a power storage module including a lithium ion battery. The state data may be transmitted from the maintenance communication device 6 to the maintenance terminal device 2. The state data transmitted from a plurality of the energy storage apparatuses 5 is transmitted to the remote monitoring system 300 via a dedicated line N2 or the communication network N, and a state history is stored in association with identification data such as a serial number for identifying each of the energy storage devices 50. The identification data for identifying each of the energy storage devices 50 is stored for each of the energy storage apparatuses 5 in association with the identification data for identifying the energy storage apparatus 5.

The energy storage apparatus 5 is provided with the maintenance communication device 6 capable of exchanging data with the maintenance terminal device 2 used by a maintenance worker without using the network CN. The maintenance communication device 6 is communicably connectable to a unit that acquires state data of each of the energy storage devices 50 of the energy storage apparatus 5. The maintenance communication device 6 according to the present embodiment is communicably connectable to a unit connected to a terminal of a lead-acid battery by wireless communication. In another example, the maintenance communication device 6 can be communicably connected to a battery management device (BMU) included in a power storage module of a lithium ion battery. The maintenance communication device 6 stores state data identical to state data transmitted from the energy storage apparatus 5 to the management apparatus 51 in a built-in memory.

The network CN is a local network of a customer who operates a plurality of the energy storage apparatuses 5. The network CN is, for example, Ethernet (registered trademark), and may be an optical line. The network CN may include a VPN. The network CN may be an ECHONET/ECHONETLite compatible network. The dedicated line N2 is a private network that connects a customer of the energy storage apparatus 5 and the remote monitoring system 300. The dedicated line N2 may be the communication network N. The dedicated line N2 may be a dedicated network compatible with ECHONET/ECHONETLite.

The maintenance support system 100 of the present embodiment supports maintenance/management of the energy storage device 50 or the energy storage apparatus 5 using the state data acquired via the maintenance terminal device 2 or the network CN of a customer, the customer data obtained from the customer data management system 400, and the diagnostic data obtained from the remote monitoring system 300. In the maintenance support system 100, the remote monitoring system 300 detects a sign of an abnormality from the aggregated state data, and the maintenance support device 1 supports work before a trouble occurs based on the detected abnormality or sign of an abnormality. The maintenance support device 1 advances arrangement of preparation work for preventing a trouble in advance according to content of the detected sign of an abnormality, and performs the preparation work by systematically stopping a system of a customer after obtaining confirmation from the customer. There is no need for a maintenance worker to manually analyze the state data. The preparation work can be performed with a schedule planned in advance so as not to hinder the operation because a measure is taken before a trouble occurs, and as a result, stop time of a system of a customer can be shortened. As a plurality of the energy storage devices 50 are used and operated as the energy storage apparatus 5, and a sign of an abnormality in a part of the energy storage devices 50 is detected, so that it is also possible to plan maintenance work in a manner that the operation of the energy storage apparatus 5 is continued. The maintenance worker does not need to visit a system of a customer many times because the preparation work arranged in advance only needs to be performed on a schedule planned in advance.

A detailed configuration for realizing the maintenance support system 100 for the energy storage device 50 will be described.

Figure 2:
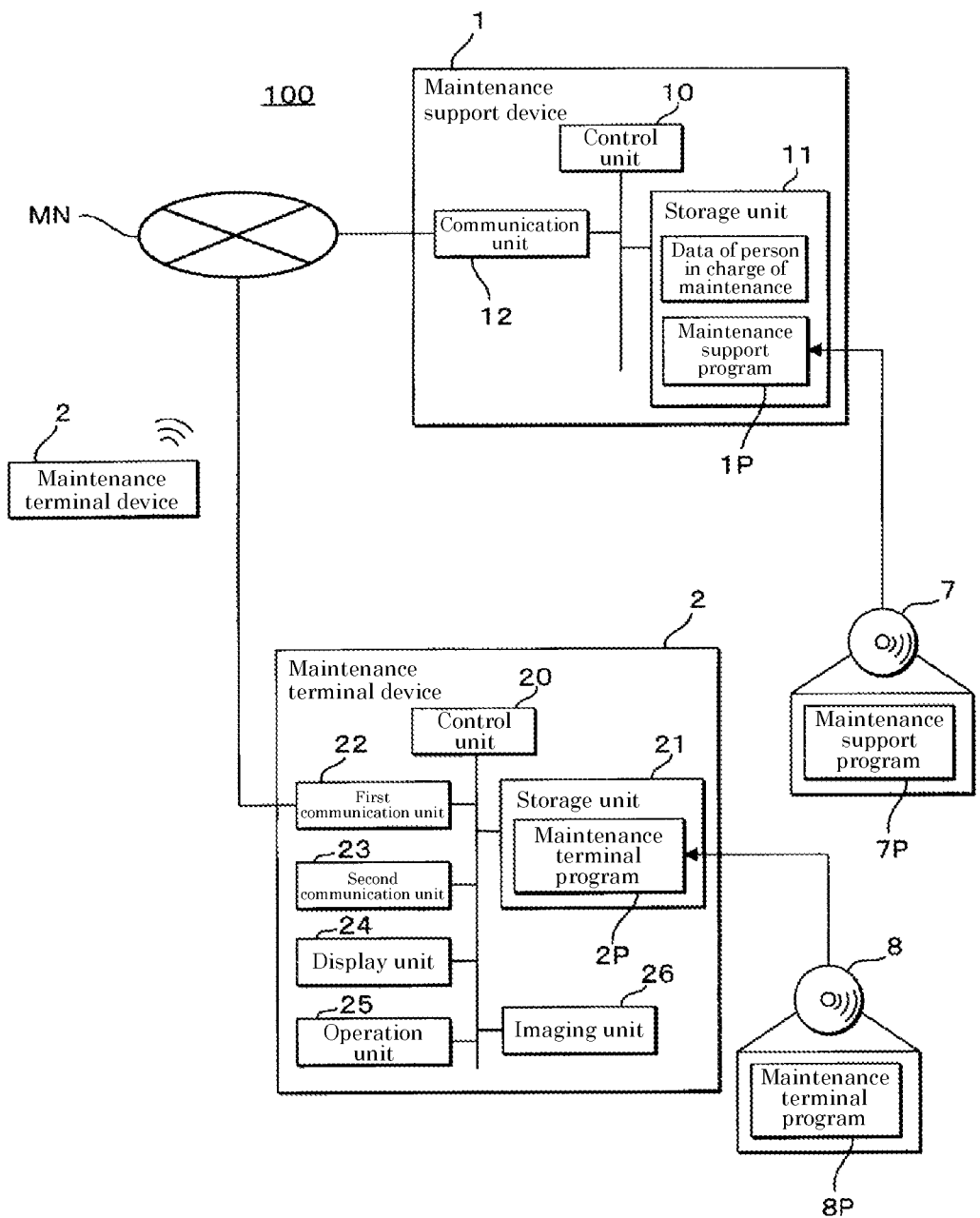
FIG. 2 is a block diagram illustrating an internal configuration of a device included in the maintenance support system.

FIG. 2 is a block diagram illustrating an internal configuration of a device included in the maintenance support system 100. The maintenance support device 1 uses a server computer and includes a control unit 10, a storage unit 11, and a communication unit 12. In the present embodiment, the maintenance support device 1 is described as one server computer. However, processing may be distributed among a plurality of server computers.

The control unit 10 is a processor using a central processing unit (CPU) or a graphics processing unit (GPU), and executes processing by controlling each component using a built-in memory such as a ROM and a RAM. The control unit 10 executes processing based on a maintenance support program 1P stored in a storage unit 21.

As the storage unit 11, for example, a non-volatile memory such as a hard disk or a solid state drive (SSD) is used. The storage unit 11 stores the maintenance support program 1P described above. The maintenance support program 1P stored in the storage unit 11 may be one that is obtained by the control unit 10 reading a maintenance support program 7P stored in a recording medium 7 and copied to the storage unit 11. The storage unit 11 stores worker data including an ID of a maintenance worker. The worker data includes contact information such as a worker name and an e-mail address in association with a worker ID.

The communication unit 12 is a communication device that realizes communication connection and data transmission and reception via the network MN. Specifically, the communication unit 12 is a network card that supports the network MN. The communication unit 12 may realize communication via the communication network N via a router device (not illustrated) connected to the network MN. The control unit 10 transmits and receives data to and from the remote monitoring system 300 and the customer data management system 400 by the communication unit 12.

The maintenance terminal device 2 is a computer used by a maintenance worker. The maintenance terminal device 2 may be a desktop or laptop personal computer, or what is called a smartphone or tablet communication terminal. The maintenance terminal device 2 includes a control unit 20, a storage unit 21, a first communication unit 22, a second communication unit 23, a display unit 24, and an operation unit 25. The maintenance terminal device 2 may include an imaging unit 26 as illustrated.

The control unit 20 is a processor using a CPU or a GPU. The control unit 20 causes the display unit 24 to display a repair procedure based on a maintenance terminal program 2P stored in the storage unit 21. The control unit 20 executes processing of reading information data from the maintenance communication device 6 and information processing with the maintenance support device 1 by a web browser included in the maintenance terminal program 2P.

The storage unit 21 uses, for example, a non-volatile memory such as a hard disk or a flash memory. The storage unit 21 stores various programs including the maintenance terminal program 2P. The storage unit 21 stores screen data based on the maintenance terminal program 2P. The maintenance terminal program 2P may be one that is obtained by the control unit 20 reading a maintenance terminal program 8P stored in a recording medium 8 and copied to the storage unit 21.

The first communication unit 22 is a communication device for realizing data communication via the communication network N or the network MN. The first communication unit 22 uses a communication device such as a network card for wired communication, a wireless communication device for mobile communication connected to a base station BS (see FIG. 1), or a wireless communication device that supports connection to an access point AP.

The second communication unit 23 is a communication device for realizing data communication by being communicably connected to the maintenance communication device 6. The second communication unit 23 may be a wireless communication device of Wi-Fi, Bluetooth (registered trademark), or the like. The second communication unit 23 may be a universal serial bus (USB) interface.

As the display unit 24, a display such as a liquid crystal display or an organic electro luminescence (EL) display is used. The display unit 24 displays an operation screen based on the maintenance terminal program 2P of the control unit 20 and an image of a web page provided by the maintenance support device 1. The display unit 24 is preferably a display incorporating a touch panel, but may be a display not incorporating a touch panel.

The operation unit 25 is a keyboard and a pointing device capable of inputting and outputting to and from the control unit 20, or a user interface such as a sound input unit. For the operation unit 25, a touch panel of the display unit 24 or a physical button provided on a housing may be used. The operation unit 25 notifies the control unit 20 of operation information by the user.

The imaging unit 26 outputs a captured image obtained using an imaging element. The control unit 20 can acquire an image captured by the imaging element of the imaging unit 26 at an optional timing.

Figure 3:
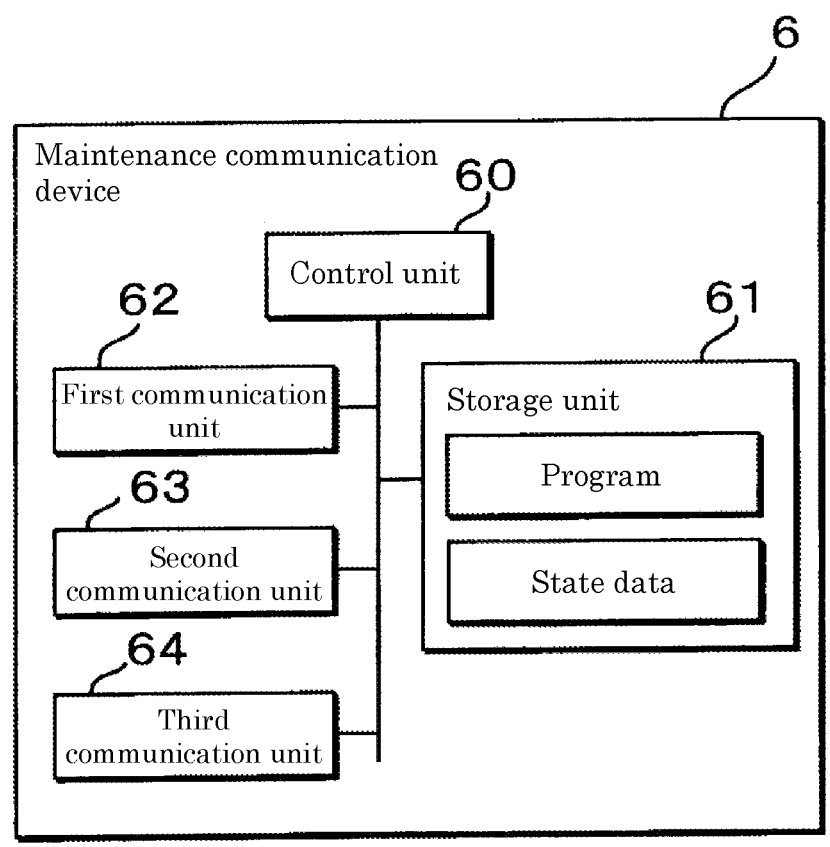
FIG. 3 is a block diagram illustrating an internal configuration of maintenance equipment.

FIG. 3 is a block diagram illustrating an internal configuration of the maintenance communication device 6. The maintenance communication device 6 includes a control unit 60, a storage unit 61, a first communication unit 62, a second communication unit 63, and a third communication unit 64. The control unit 60 uses a CPU or a microprocessor. The storage unit 61 stores a program specified in advance.

The storage unit 61 uses a non-volatile memory such as a flash memory. The storage unit 61 stores state data received from the energy storage device 50.

The first communication unit 62 is a communication device that realizes communication connection with a unit connected to the energy storage device 50. In the present embodiment, the first communication unit 62 is communicably connected to a unit of the energy storage device by wireless communication by Bluetooth (registered trademark) or the like.

The second communication unit 63 is a communication device that realizes communication connection via the network CN. The maintenance communication device 6 can transmit state data received from the energy storage device 50 to the management apparatus 51 by the second communication unit 63. In a case where the energy storage device 50 includes a battery management device having a communication function, the second communication unit 63 is unnecessary.

The third communication unit 64 is a communication device that realizes communication connection between the maintenance communication device 6 and the maintenance terminal device 2. In the present embodiment, the third communication unit 64 is a USB interface. The third communication unit 64 may be a wireless communication device different from the first communication unit 62.

The control unit 60 of the maintenance communication device 6 periodically acquires state data from the energy storage device 50 by the first communication unit 62 based on a program, and sequentially stores the acquired state data in the storage unit 61. A cycle of the storage is, for example, about once a day in a case where the energy storage device 50 is a lead-acid battery. The control unit 60 stores date and time of acquisition in the storage unit 61 in association with the state data. The control unit 60 sequentially transmits the acquired state data from the second communication unit 63 to the management apparatus 51. In a case where the control unit 60 is communicatively connected to the maintenance terminal device 2 by the third communication unit 64 based on the program, the control unit 60 reads state data from the storage unit 61 in response to an instruction from the maintenance terminal device 2 and transmits the state data from the third communication unit 64.

Maintenance/management is supported by the maintenance support system 100 configured as described above and the maintenance communication device 6 provided in the energy storage apparatus 5 as described below.

First, state data that is not transmitted to the remote monitoring system 300 via the network CN by the maintenance communication device 6 can also be aggregated by remote monitoring system 300. The state data accumulated in the maintenance communication device 6 is acquired by the maintenance terminal device 2 possessed by a maintenance worker at the time of performing periodic maintenance inspection, and is aggregated from the maintenance terminal device 2 to the remote monitoring system 300 via the network MN or the communication network N. Even in a case where communication connection between the network CN of a customer and the remote monitoring system 300 is difficult in terms of security, the state data can be aggregated in the remote monitoring system 300 at the time of periodic inspection.

Second, in the remote monitoring system 300 in which state data is aggregated, for each of the target energy storage devices 50, for example, the energy storage apparatus 5 to which a plurality of the energy storage devices 50 are connected, processing described later is periodically executed to determine whether or not there is a sign of an abnormality (second phase). In a case where the energy storage device 50 is a lead-acid battery, the execution cycle is three months, six months, or the like. The execution cycle is shorter than the cycle of the periodic inspection. In a case where the energy storage device 50 is a lithium ion battery, the execution cycle may be similar to the cycle of the periodic inspection. The cycle may be shortened according to a use period.

Third, in a case where a sign of an abnormality is detected by the processing of the remote monitoring system 300, the maintenance support device 1 arranges maintenance work to prevent a trouble before the trouble occurs (third phase). A maintenance worker is notified of the arranged content, and the maintenance worker visits an installation place of the energy storage apparatus 5 where the sign is detected based on the notified work content and performs the work.

Hereinafter, processing in the second phase and the third phase will be described in detail.

Figure 4:
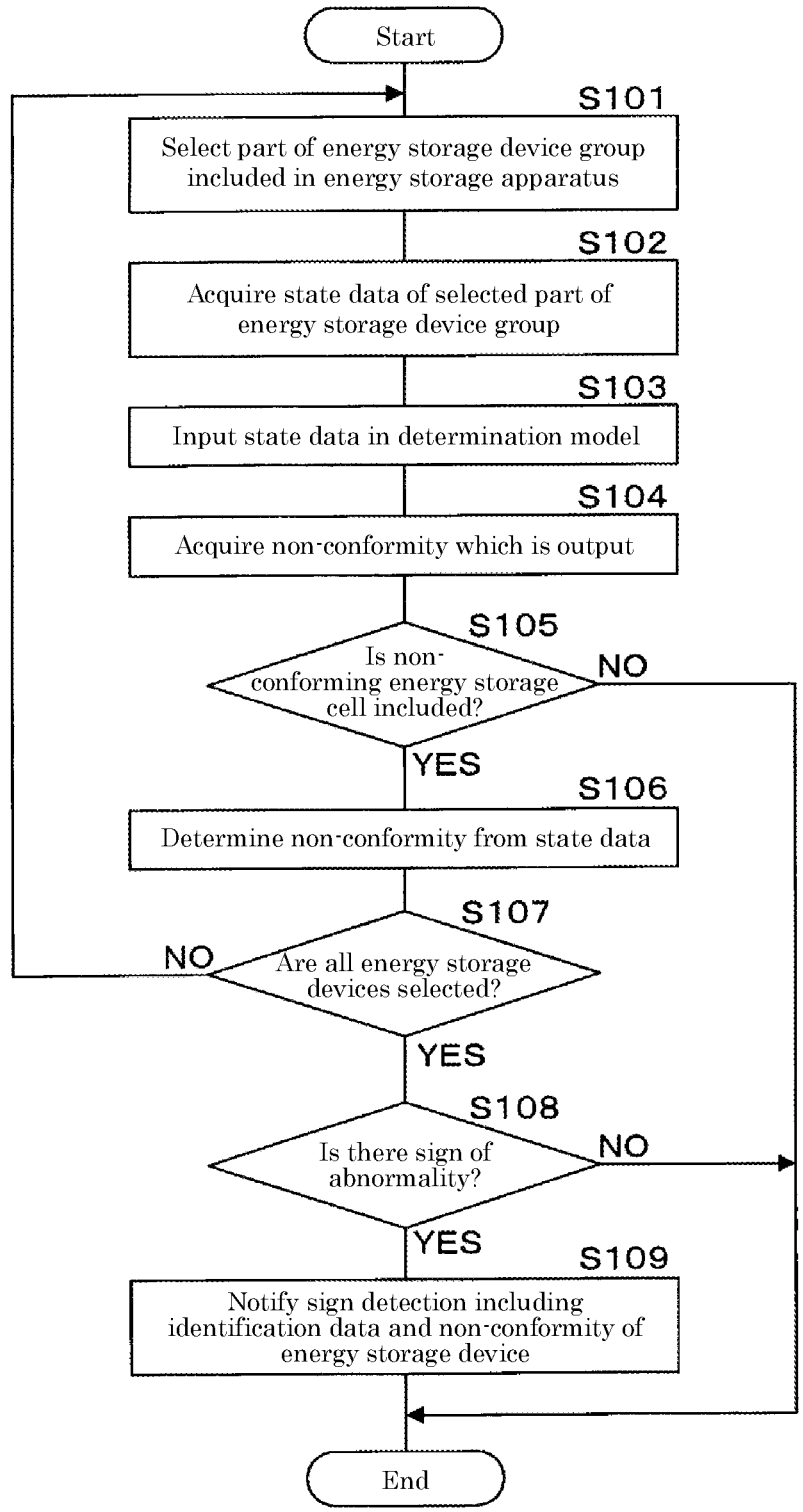
FIG. 4 is a flowchart illustrating an example of a processing procedure for detecting a sign of an abnormality in a second phase in a remote monitoring system.

FIG. 4 is a flowchart illustrating an example of a processing procedure for detecting a sign of an abnormality in the second phase in the remote monitoring system 300. The remote monitoring system 300 executes processing below each time a cycle arrives.

The remote monitoring system 300 selects a part of a plurality of the energy storage devices 50 included in the energy storage apparatus 5 (Step S101). In Step S101, the remote monitoring system 300 selects identification data of an energy storage device group corresponding to identification data of the energy storage apparatus 5 to which the energy storage device 50 belongs.

The remote monitoring system 300 acquires state data of the selected energy storage device group (Step S102). The state data acquired in Step S102 is, for example, latest data of a voltage value. The state data may be an internal resistance value.

The remote monitoring system 300 inputs the acquired state data to the determination model 3M (Step S103), and acquires a score regarding determination output from the determination model 3M (Step S104). In the present embodiment, the score is a score corresponding to whether or not measurement data of a non-conforming energy storage device is included in the input state data.

The remote monitoring system 300 determines whether or not measurement data of a non-conforming energy storage device is included based on the score output from the determination model 3M (Step S105). When it is determined in Step S105 that measurement data of a non-conforming energy storage device is included (S105: YES), the remote monitoring system 300 determines non-conformity based on the acquired state data of a plurality of the energy storage devices 50 included in the energy storage apparatus 5 in which the sign is determined to exist (Step S106). The determination model 3M will be described later.

The remote monitoring system 300 determines whether or not all of a plurality of the energy storage devices 50 included in the target energy storage apparatus 5 are selected (Step S107), and in a case where it is determined that not all the energy storage devices are selected (S107: NO), the processing returns to Step S101.

When it is determined that all the energy storage devices 50 are selected (S107: YES), the remote monitoring system 300 determines whether or not there is a sign of an abnormality in the energy storage apparatus 5 based on the non-conformity determined in Step S106 (Step S108). The non-conformity includes one that is not related to an abnormality, for example, one that is new, or one that has a long lifetime compared to an assumed model at the time of manufacture. In Step S108, the remote monitoring system 300 detects a sign of an abnormality in a case where the energy storage device 50 having such non-conformity that its life is abnormally short is included. The possibility that a long-life one of the energy storage device 50 and a new one of the energy storage device 50 become unbalanced with other ones of the energy storage devices 50 and cause a trouble is not zero. Therefore, such non-conformity may also be determined as a sign of an abnormality. A score regarding the non-conformity may be output in the determination model 3M, and Steps S105 to S108 may be collectively executed.

When it is determined that there is a sign of an abnormality (S108: YES), the remote monitoring system 300 notifies the maintenance support device 1 of identification data of the selected energy storage apparatus 5, identification data of an energy storage device group determined to include a non-conforming one of the energy storage device 50, and a message of sign detection including non-conformity (Step S109), and ends the processing.

In a case where it is determined in Step S105 that measurement data of an extraneous energy storage device is not included (S105: NO) and in a case where it is determined in Step S108 that there is no sign of an abnormality (S108: NO), the remote monitoring system 300 ends the processing without proceeding further.

Figure 5:
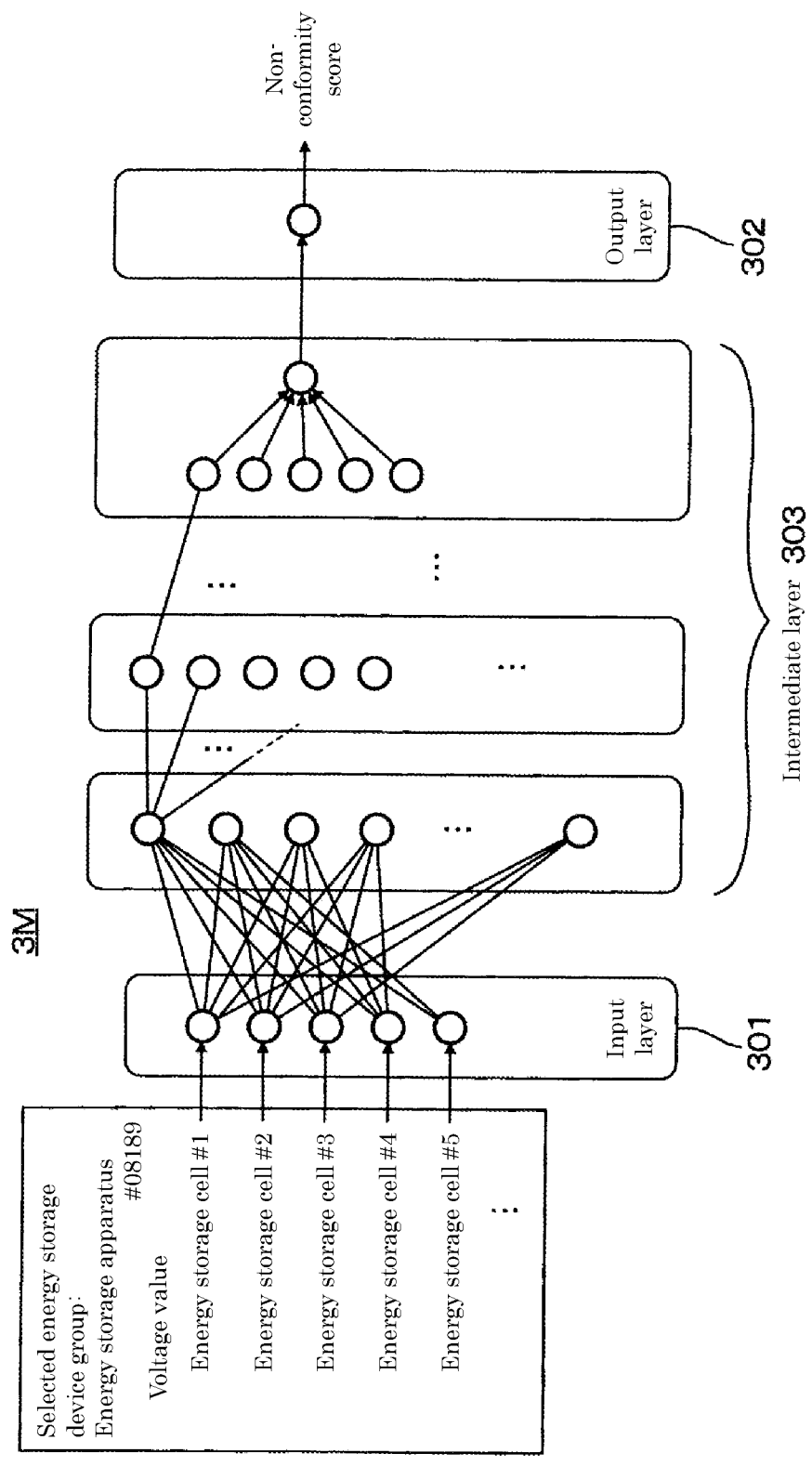
FIG. 5 illustrates an outline of a determination model.

FIG. 5 illustrates an outline of the determination model 3M. In one example, the determination model 3M is a classifier that uses a convolutional neural network to classify the energy storage apparatus 5 including the energy storage device 50 that is not non-conforming and is standard and the energy storage apparatus 5 including the other energy storage devices 50 that are non-conforming. In the example shown in FIG. 5, the determination model 3M includes an input layer 301 to which a voltage value of each of the energy storage devices 50 included in the selected energy storage apparatus 5 is input, an output layer 302 where a score related to the non-conformity degree based on the input voltage value is output, and an intermediate layer 303 including a convolution layer or a pooling layer. The determination model 3M is learned by giving, to a neural network, training data including state data to which a label (for example, "0") indicating a standard energy storage cell (lead-acid battery or lithium ion battery cell) that is not non-conforming is attached and state data to which a non-conforming label (for example, "1") is attached. In the example of FIG. 5, learning is performed using a voltage value measured for each of the energy storage devices 50. However, the learning may be performed using an internal resistance value. The determination model 3M outputs a score of non-conformity degree (a numerical value between 0 to 1) for given state data from the output layer 302.

The determination model 3M is not limited to a classifier, and may be a convolutional neural network that outputs a feature amount. The determination model 3M may be configured by a network using a recurrent neural network, a long short-term memory (LSTM), or the like that receives input of time-series data of measurement data of the same energy storage device 50 and outputs a feature amount.

In another example, the determination model 3M may be a model that statistically calculates whether or not an outlier is included and the outlier degree in a case where the outlier is included by using an average, a standard deviation, a median value, or the like of a voltage value or an internal resistance value. In another example, the determination model 3M may be a model that obtains a trend by time series data of state data and outputs a score representing non-conformity degree by a difference in trend. In another example, the determination model 3M may use a k-nearest neighbor algorithm, and the remote monitoring system 300 may determine whether the target measurement data belongs to a conforming class learned in advance based on training data or a non-conforming class. In another example, the determination model 3M may use the k-means clustering or an EM algorithm, and the remote monitoring system 300 may perform clustering based on the determination model 3M (determination program) to perform determination. In another example, the determination model 3M (determination program) may determine whether or not target measurement data is reduced and non-conforming by using the principal component analysis (PCA).

Figure 6:
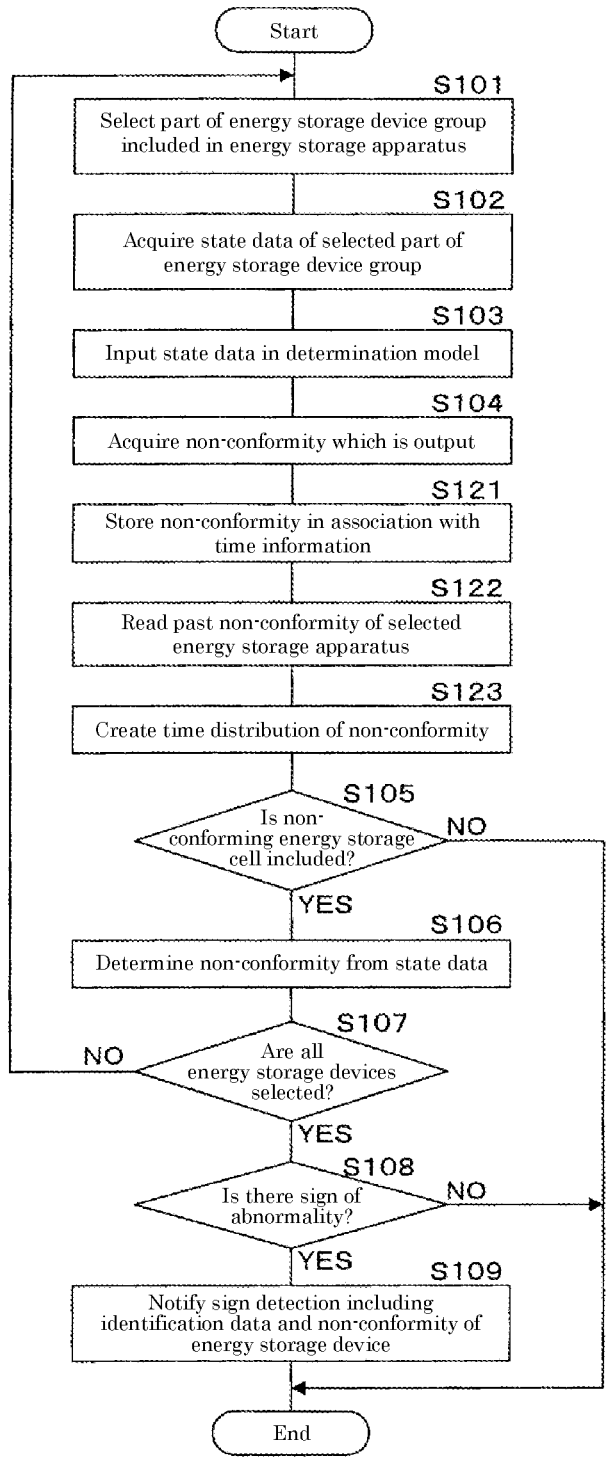
FIG. 6 is a flowchart illustrating another example of the processing procedure for detecting a sign of an abnormality in the second phase in the remote monitoring system.

The accuracy of the determination as to whether or not a non-conforming one of the energy storage device 50 is included in an energy storage device group is improved by using time transition of the non-conformity degree to be output. FIG. 6 is a flowchart illustrating another example of a processing procedure for detecting a sign of an abnormality in the remote monitoring system 300. In the processing procedure illustrated in the flowchart of FIG. 6, a procedure common to the procedure illustrated in the flowchart of FIG. 4 is denoted by the same step number, and omitted from detailed description.

The remote monitoring system 300 stores the non-conformity degree acquired in Step S104 in association with identification data and time information of the selected energy storage apparatus 5 (Step S121).

The remote monitoring system 300 reads the non-conformity degree stored in a past predetermined period for the energy storage apparatus 5 selected in Step S101 (Step S122). Remote monitoring system 300 creates time distribution of the non-conformity degree for the past predetermined period (Step S123).

The remote monitoring system 300 determines whether or not an energy storage device group includes a non-conforming energy storage cell based on a value of the non-conformity degree read in Step S122, the time distribution created in Step S123, and/or state data itself of the energy storage devices 50 included in the selected energy storage apparatus 5 (S105). In a case where it is determined in Step S105 that a non-conforming energy storage cell is included (S105: YES), the remote monitoring system 300 may distinguish the urgency using the time distribution created in Step S123 in Step S106. The remote monitoring system 300 may determine whether it is the non-conformity by which a trouble occurs within one month or three months or the non-conformity by which continuous operation is expected for about six months.

Detection accuracy can be enhanced by detecting a sign of an abnormality on the basis of time distribution. The non-conformity of the connected energy storage device group is balanced over time, and there is a possibility that the non-conformity is normalized. In order not to erroneously detect the above as a sign of an abnormality, a sign of an abnormality is detected on the basis of time distribution.

Figure 7:
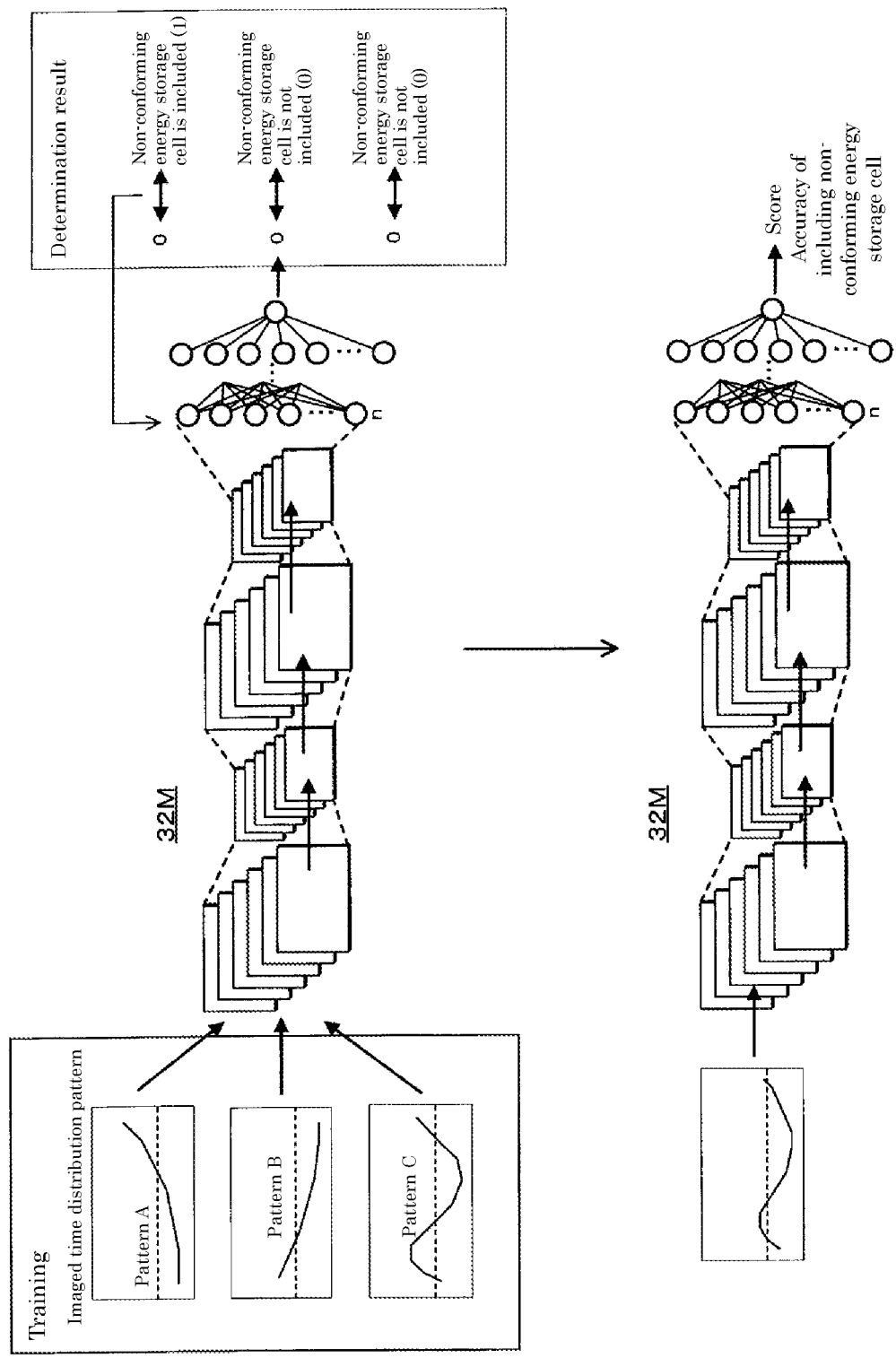
FIG. 7 illustrates an outline of an image determination model.

Deep learning may be applied to the processing of Step S105 itself. Time distribution of non-conformity degree may be imaged and input, and whether or not a target is non-conforming or non-conformity may be determined depending on a pattern of the time distribution. FIG. 7 illustrates an outline of an image determination model 32M used for detecting an abnormal sign. The image determination model 32M illustrated in FIG. 7 receives input of the time distribution of non-conformity degree output from the determination model 3M learned to output non-conformity degree in a case where state data is input, and outputs a score indicating the accuracy as to whether or not a non-conforming cell is included.

The image determination model 32M is a neural network including an intermediate layer including a convolution layer or a pooling layer that extracts a feature amount, and in a case where an image of time distribution is input, the image determination model 32M outputs the accuracy (score) including measurement data of a non-conforming electricity storage cell in measurement data related to the time distribution. The image determination model 32M is stored in the remote monitoring system 300 together with the determination model 3M. As illustrated in FIG. 7, the image determination model 32M is learned by training data that is a pair of an image of time distribution and a result determined by an operator.

When training data can be collected, the image determination model 32M may be learned as a model for determining non-conformity of a non-conforming energy storage cell. For example, it may be determined which one of a pattern A, a pattern B, and a pattern C in FIG. 7 is applied, that is, non-conformity, may be determined. The remote monitoring system 300 may determine the non-conformity based on a value of the non-conformity degree used for the determination in Step S105 in the flowchart of FIG. 6, the time distribution created in Step S123, and/or state data of the selected energy storage apparatus 5. The remote monitoring system 300 may identify the degree of non-conformity, that is, how far a non-conformity one is out of the standard energy storage device 50. In another example, the remote monitoring system 300 may use the image determination model 32M to determine the non-conformity, such as whether the non-conformity is "new energy storage cell", "energy storage device with better quality (longer life) than standard energy storage device", or "energy storage device with shorter life than standard energy storage device".

The determination model 3M was learned to output non-conformity degree as described above. A non-conformity one of the energy storage device 50 that does not match an assumed model at the time of manufacturing is set as a replacement target, so that the energy storage device 50 included in the energy storage apparatus 5 is considered to match the assumed model at the time of manufacturing, and an effect of improving the accuracy of degradation degree or life prediction is expected. Detection of a sign of an abnormality is not limited to a method using non-conformity degree.

The determination model 3M may be learned as a model that outputs a determination label of content of a sign of an abnormality and a score indicating accuracy without using non-conformity degree. The accumulated data of time distribution of state data of the energy storage device 50 in which an abnormality has been detected in the past and time distribution of state data until the life of the standard energy storage device 50 matching the assumed model at the time of manufacturing is completed may be learned as known training data.

Figure 8:
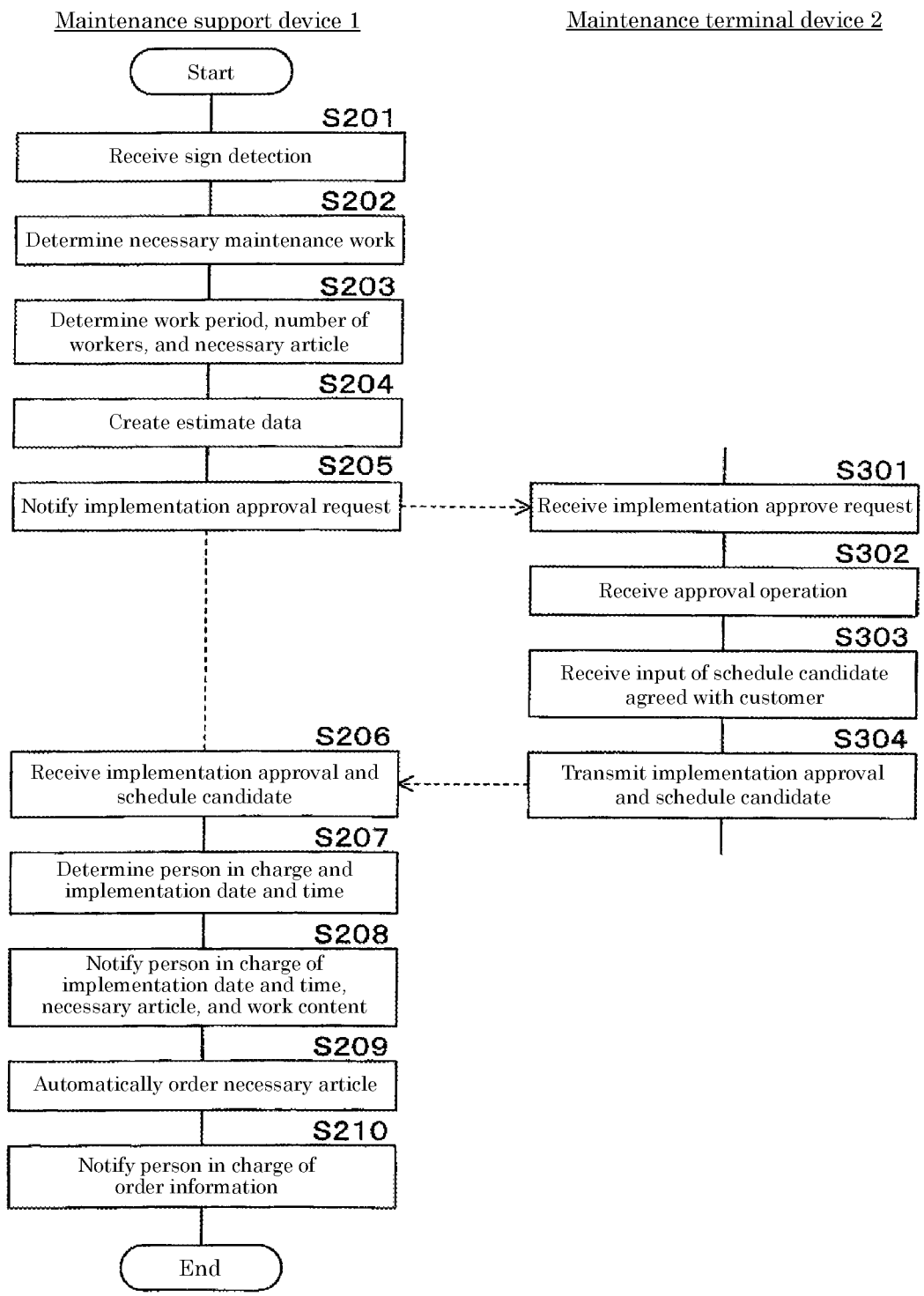
FIG. 8 is a flowchart illustrating an example of a processing procedure in a third phase in the maintenance support system.

FIG. 8 is a flowchart illustrating an example of a processing procedure in the third phase in the maintenance support system 100. When the maintenance support device 1 receives a message of sign detection from the remote monitoring system 300 (Step S201), the control unit 10 determines necessary maintenance work based on identification data and non-conformity of an energy storage device group including a non-conforming one of the energy storage device 50 included in the message (Step S202). Content of the maintenance work is tabulated and stored in the storage unit 11 in association with non-conformity, and the control unit 10 may determine the content of the maintenance work by referring to the table, or may determine the content of the maintenance work by a learning model machine-learned on the basis of a past maintenance work history so as to output content of the maintenance work (work period to be described later, number of workers, and a necessary item) in a case where a history of non-conformity or state data is input.

In a case where the urgency is distinguished in the non-conformity, in Step S202, the control unit 10 can appropriately determine the maintenance work content according to the urgency such as whether it is a sign that a trouble will occur within one month or a sign that normal operation can be performed for about six months. The correspondence between the non-conformity and the content of the maintenance work is preferably stored in the storage unit 11 by distinguishing the urgency.

In Step S202, the control unit 10 determines maintenance work for an energy storage device group including a non-conforming one of the energy storage devices 50 so that operation of the other energy storage device groups can be continued and operation of the energy storage apparatus 5 as a whole can be continued. The energy storage apparatus 5 can take a measure such that the operation as a whole is continued even if there is an abnormality in a part including a plurality of the energy storage devices 50.

The control unit 10 determines a work period of the determined maintenance work, the number of workers, and an item including a replacement or a tool necessary for the maintenance work (Step S203). The determination in Step S203 may also be table-based or machine-learning-based as described above.

The control unit 10 creates estimate data on the basis of the determined work period, number of workers, and necessary item (Step S204). The storage unit 11 stores a work period for creating estimate data, a unit price for a worker, a work amount, and cost of a necessary item, and the control unit 10 automatically creates the estimate data with reference to these. The unit price may be changed according to the skill of a worker.

The control unit 10 notifies the sales representative of the target energy storage apparatus 5 of the created estimate data or an implementation approval request including a link to the data (Step S205).

The maintenance terminal device 2 used by the sales representative receives the implementation approval request for the maintenance work (Step S301). The sales representative submits an estimate to a customer based on the estimate data included in the received implementation approval request, and receives approval to perform maintenance work. In a case where the approval is received, in the maintenance terminal device 2, the control unit 20 receives approval operation according to operation of the operation unit 25 (Step S302). The control unit 20 receives input of a schedule candidate based on the agreement with the customer by the operation unit 25 together with the approval operation (Step S303), and transmits the received implementation approval and schedule candidate to the maintenance support device 1 (Step S304).

The maintenance support device 1 receives the implementation approval and the schedule candidate from the maintenance terminal device 2 (Step S206). The control unit 10 determines a worker and implementation date and time of the maintenance work based on the schedule received in Step S206, the operation information of the energy storage apparatus 5 based on the customer data management system 400, a worker list of the maintenance work, and schedule data of each worker (Step S207). In Step S207, the control unit 10 may determine the implementation date and time according to urgency. Also in Step S207, the control unit 10 can determine a worker and implementation date and time based on the operation information and the schedule approved by the customer so as to continue the operation of the energy storage apparatus 5 as a whole using another energy storage device group excluding an energy storage device group including a non-conforming one of the energy storage device 50.

The control unit 10 notifies the determined implementation date and time, necessary item, and work content to the determined worker (Step S208). The control unit 10 orders the necessary item (Step S209), notifies the worker of order information (Step S210), and ends the processing. The order information in Step S209 may be registered as a customer asset in the customer data management system 400.

As described above, at the stage of a sign of an abnormality that is difficult for a human to detect, content of the maintenance work for preventing a trouble in advance is determined, and even an estimate is created, so that the burden on the maintenance worker is reduced.

Second Embodiment

By remotely checking state data of an energy storage device, a maintenance worker can detect that an abnormality occurs. A maintenance worker visits an installation place of an energy storage device for an abnormality that occurs, investigates a cause of the abnormality, and takes measures such as replacing the energy storage device in which the abnormality occurs. Depending on a skill level of the maintenance worker, a large difference occurs in time required for maintenance. There is a demand for maintenance/management that enables continuous operation of a system including an energy storage device.

A maintenance support method narrows down causes of an abnormality or a sign of an abnormality of an energy storage device from a plurality of cause candidates to one or a plurality of cause candidates based on measurement data related to the energy storage device, selects a repair process corresponding to the narrowed-down cause from repair processes stored in association with a plurality of cause candidates, and outputs a repair procedure to be executed based on the selected repair process.

Although an abnormality or a sign of an abnormality of an energy storage device cannot be determined from the appearance in some cases, it is possible to detect an abnormality or a sign of an abnormality by taking measurement data of the energy storage device. Conventionally, a maintenance worker has determined from which measurement data and what kind of an abnormality occurs, and repaired the abnormality in a non-uniform manner. With the above configuration, regardless of who the maintenance worker is, a repair procedure based on a repair process stored in advance as a best procedure according to a narrowed cause is output to a device used by the maintenance worker. Uniform repair work is performed regardless whether the worker is skilled or not.

A result of work based on the repair procedure may be received, causes may be further narrowed down according to the received result, and output of a repair procedure to be executed next based on the cause and reception of a result of the work may be repeatedly executed until the repair is completed.

Even in a case where a cause of an abnormality or a sign of an abnormality cannot be identified only by measurement data acquired in advance, it is possible to present a procedure for identifying a cause at a repair site according to a result of work in a case where a repair process is executed. This enables an unskilled worker to perform similar repair work.

According to the narrowed cause, repair arrangement data including identification data of a replacement member, a measuring instrument, or a tool necessary for repair work may be transmitted to the worker of the repair work.

For example, in a case where degradation of an energy storage device is estimated as a cause of an abnormality from measurement data of an energy storage device, the maintenance worker brings an energy storage device for replacement. In a case where, from measurement data, an abnormality or detection of an abnormality is estimated due to a structural factor or an electrical circuit factor other than the energy storage device, various tools corresponding to the abnormality are required according to a situation. With the above configuration, a replacement member, a measuring instrument, a tool, and the like necessary for repair work are arranged. Since a necessary item is automatically arranged, it is possible to avoid a situation in which a maintenance worker who visits a site forgets to carry the tool and visits the site again, and efficiency of maintenance activities can be expected to be improved regardless of the skill of the maintenance worker. As a replacement member is automatically arranged, association with a management system of delivery to a customer is also possible, and it is possible to check a history of what kind of part is replaced and when.

According to the narrowed cause or a result of work, a schedule of a skilled person necessary for repair work may be arranged, and the repair procedure may be output on the basis of an instruction from the skilled person.

With the above configuration, even in a case of an event that cannot be covered by the repair process, remote support or the like by a skilled person is smoothly performed. From this, uniform repair work is performed regardless of whether or not a maintenance worker who actually performs repair work is a skilled person.

Causes of the abnormality or the sign may be narrowed down using a learning model learned to output a cause and accuracy in a case where the measurement data is input.

By using the learning model, there is a possibility that an abnormality or a sign of an abnormality that is difficult for a human to determine from the appearance or the measurement data can be detected. Although a state of the energy storage device cannot be directly measured, there is a possibility that the state of the energy storage device can be accurately estimated from the measurement data by the learning model. Estimation accuracy can be enhanced by utilizing past repair records for estimation of a cause appearing in a plurality of pieces of measurement data.

A maintenance support system includes a storage device that periodically acquires and sequentially stores measurement data on an energy storage device, a maintenance terminal device that can establish communication connection with the storage device, and a maintenance support device to which communication connection can be established from the maintenance terminal device. The maintenance support device narrows down causes of an abnormality or a sign of an abnormality of the energy storage device from a plurality of cause candidates to one or a plurality of cause candidates based on the measurement data acquired from the storage device, selects a repair process corresponding to the narrowed-down cause from repair processes stored in association with a plurality of the cause candidates, and transmits a repair procedure to be executed based on the selected repair process to the maintenance terminal device.

The maintenance support device may receive a result of work based on the repair procedure from the maintenance terminal device, further narrow down causes according to the received result, and repeatedly execute transmission of a repair procedure to be executed next based on the cause and reception of a result of work until repair is completed.

A maintenance support device includes a cause estimation unit that narrows down causes of an abnormality or a sign of an abnormality of an energy storage device from a plurality of cause candidates to one or a plurality of cause candidates based on measurement data related to the energy storage device, a process selection unit that selects a repair process corresponding to the narrowed-down cause from repair processes stored in association with a plurality of cause candidates, and a procedure output unit that outputs a repair procedure to be executed based on the selected repair process.

A computer program causes a computer to execute processing of narrowing down causes of an abnormality or a sign of an abnormality of an energy storage device from a plurality of cause candidates to one or a plurality of cause candidates based on measurement data related to the energy storage device, selecting a repair process corresponding to the narrowed-down cause from repair processes stored in association with a plurality of cause candidates, and outputting a repair procedure to be executed based on the selected repair process.

Figure 9:
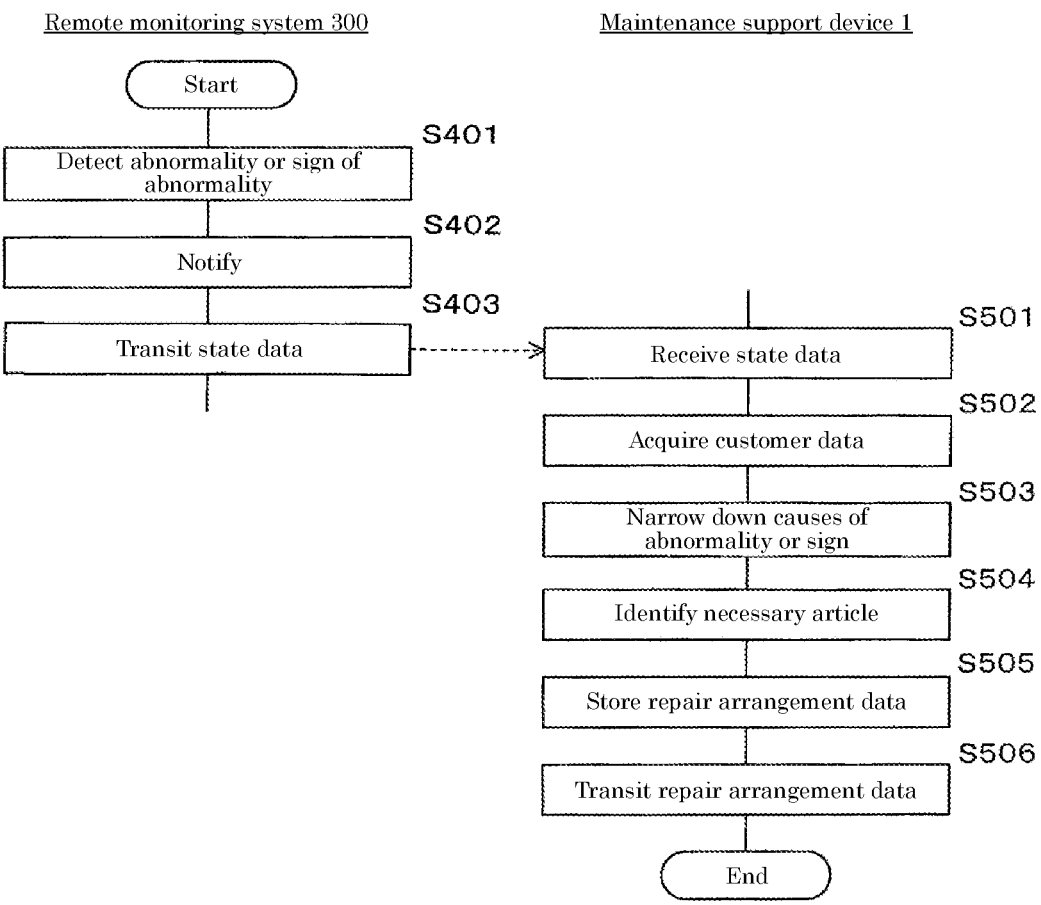
FIG. 9 illustrates a repair sequence in the maintenance support system.

The maintenance support system 100 according to the present embodiment supports maintenance/management of a group of the energy storage devices 50 as described below. FIG. 9 illustrates a repair sequence in the maintenance support system 100. FIG. 9 illustrates a procedure in a scene from detection of an abnormality to repair arrangement.

The remote monitoring system 300 detects an abnormality based on state data aggregated via the management apparatus 51 of an operator or the maintenance communication device 6 (Step S401). The remote monitoring system 300 notifies a manager of a system including the energy storage device 50 in which an abnormality is detected and a maintenance worker of the abnormality (Step S402). Specifically, the notification in Step S402 is given to the contact information of the manager of the system referred to in a customer management system and the maintenance worker. Notification may be made to the maintenance terminal device 2.

The remote monitoring system 300 transmits state data relating to the detected abnormality to the maintenance support device 1 in association with identification data of the energy storage device 50 in which the abnormality is detected (Step S403).

The maintenance support device 1 receives the state data by the communication unit 12 in association with identification data of the energy storage device 50 in which the abnormality is detected (Step S501). The control unit 10 acquires customer data including a delivery date from the customer management system based on the identification data of the energy storage device 50 (Step S502). The customer data preferably includes a name and an address of a delivery destination of the energy storage device 50.

The control unit 10 narrows down causes of the abnormality or a sign of abnormality on the basis of the received state data (Step S503). In Step S503, for example, the control unit 10 estimates causes which are different between a case where a voltage value included in the state data exceeds an upper limit of a scope set as a normal scope for a type, a model, or an individual one of the energy storage devices 50 and a case where the voltage value exceeds a lower limit of the scope. The control unit 10 may estimate causes which are different between a case where the internal resistance value exceeds an upper limit of a scope set as a normal scope and a case where the internal resistance value exceeds a lower limit of the scope. The control unit 10 may estimate causes which are different between a case where a temperature included in the state data exceeds an upper limit set as a normal scope and a case where the temperature exceeds a lower limit of the scope.

The control unit 10 identifies identification information of an item necessary for repair for suppressing the progress of a phenomenon that becomes an abnormality or a sign of an abnormality due to the narrowed cause (Step S504). The storage unit 11 preferably stores identification information of a necessary item in advance for each cause narrowed down in Step S503. In one example, the item is a replacement part of the energy storage device 50. The item is, in another example, a measuring instrument for identifying a detailed cause.

The control unit 10 stores, in the storage unit 11, repair arrangement data that includes the identification data of the energy storage device 50 of the target in which the abnormality or the sign of an abnormality is detected, the narrowed cause, and the identification information of the identified item, and is for arrangement of repair as unhandled data, (Step S505). The control unit 10 transmits the repair arrangement data to a maintenance worker who performs repair work of the system in which the abnormality is detected (Step S506), and terminates the processing once. The transmission in Step S506 may be performed by e-mail to an e-mail address of the maintenance worker. A notification may be transmitted as a message to the maintenance terminal device 2 used by the maintenance worker.

The maintenance worker who receives the notification of the abnormality and the repair arrangement data visits an installation place of the energy storage device 50 in which the abnormality is detected by using the maintenance terminal device 2 in which the maintenance terminal program 2P is installed in the tablet terminal device. The maintenance worker safely establishes communication connection between the maintenance terminal device 2 and the maintenance support device 1 via the communication network N, and advances repair according to a procedure indicated by data exchange with the maintenance support device 1.

Figure 10:
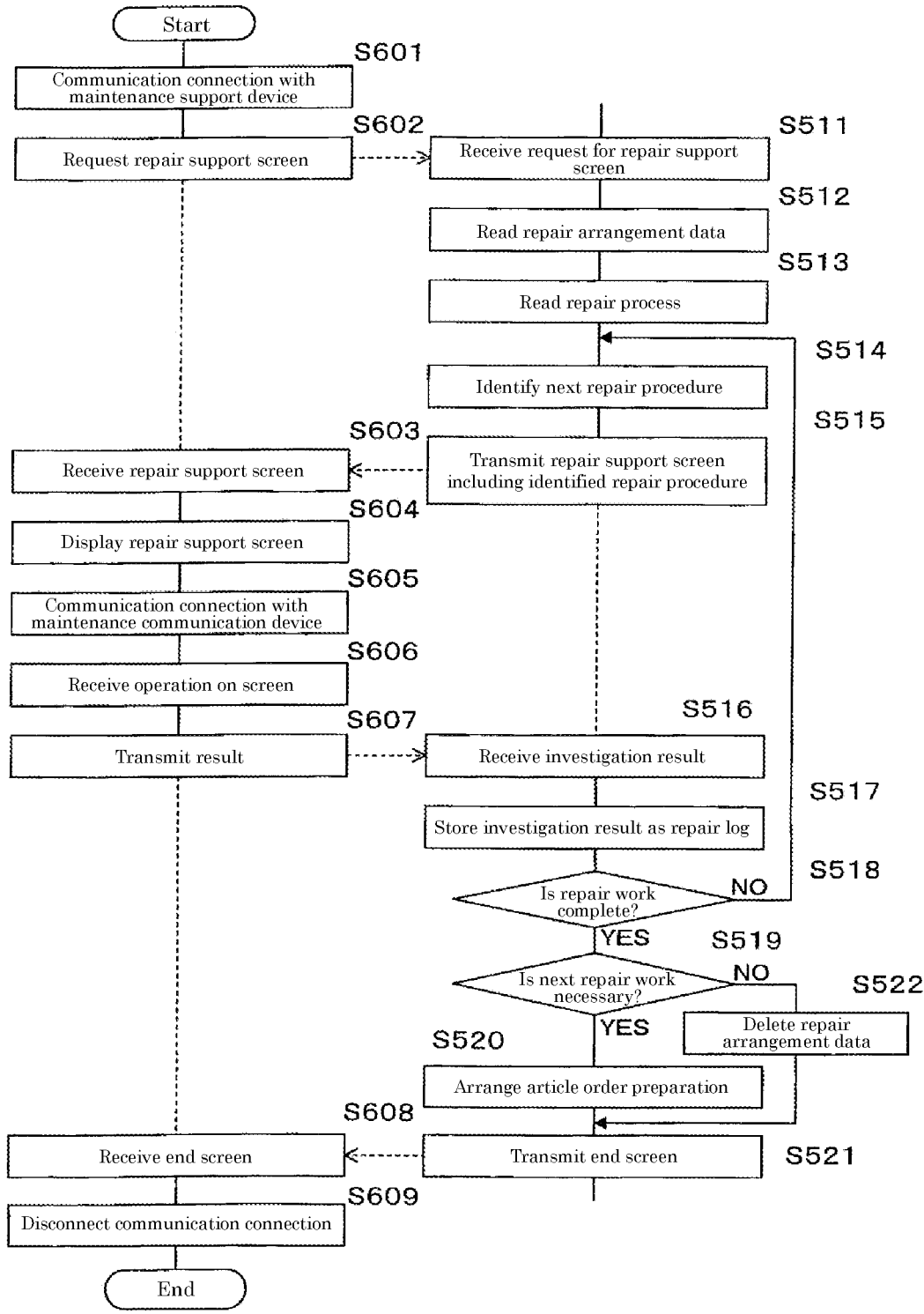
FIG. 10 illustrates a repair sequence in the maintenance support system.

FIG. 10 illustrates a repair sequence in the maintenance support system 100. The sequence of FIG. 10 illustrates a procedure at a repair site from after the repair arrangement.

When the maintenance worker uses the maintenance terminal device 2 to perform operation of establishing communication connection with the maintenance support device 1 via the first communication unit 22, the control unit 20 establishes communication connection with the maintenance support device 1 via the communication network N (Step S601).

The control unit 20 requests the maintenance support device 1 for a repair support screen in association with identification data such as a serial number for identifying the energy storage device 50 to be repaired (Step S602).

Upon receiving the request for the repair support screen (Step S511), the control unit 10 of the maintenance support device 1 reads the repair arrangement data including the identification data from the storage unit 11 in response to the request (Step S512), and reads a repair process corresponding to the repair arrangement data from the storage unit 11 (Step S513). The control unit 10 identifies a repair procedure to be executed next based on the repair process (Step S514), and transmits a repair support screen including the identified repair procedure to the maintenance terminal device 2 (Step S515). The repair support screen includes a message or an image that is stored in the storage unit 11 and indicates a repair procedure based on the repair process corresponding to the narrowed cause. The repair support screen preferably includes an interface for inputting, in the message or the image indicating a repair procedure, whether or not the procedure is performed and how a result of the procedure is.

In the maintenance terminal device 2, the first communication unit 22 receives the repair support screen transmitted from the maintenance support device 1 (Step S603), and the control unit 20 displays the repair support screen on the display unit 24 (Step S604).

The repair support screen preferably includes a message prompting that communication connection between the maintenance terminal device 2 and the maintenance communication device 6 is established by the second communication unit 23. The control unit 20 is communicably connected to the maintenance communication device 6 (Step S605). The processing of Step S605 is unnecessary in a case where the state data is normally transmitted from the maintenance communication device 6 to the remote monitoring system 300.

The control unit 20 receives operation by the operation unit 25 of the maintenance worker on the repair support screen indicating the repair procedure displayed on the display unit 24 (Step S606). The control unit 20 transmits an operation result to the maintenance support device 1 (Step S607). The operation received in Step S606 may include measurement of state data via the maintenance communication device 6 and control of the energy storage device 50 via the maintenance communication device 6.

The maintenance support device 1 receives the operation result on the repair support screen by the communication unit 12 (Step S516), and every time the operation result is received, the control unit 10 stores the operation result in the storage unit 11 as a repair log in association with the identification data of the energy storage device 50 (Step S517).

The control unit 10 determines whether or not the repair work is completed based on the received operation result (Step S518). In a case where it is determined that the processing is not completed (S518: NO), the control unit 10 returns the processing to Step S514 and identifies a next procedure.

In a case where it is determined in Step S518 that the repair work is completed (S518: YES), the control unit 10 determines whether or not next repair work is necessary (Step S519). In a case where the repair work is determined to be necessary in Step S519 (S519: YES), order preparation of an item such as a replacement member is executed in cooperation with the customer data management system 400 (Step S520). The control unit 10 once ends the repair processing, transmits an end screen including a message notifying about next repair work and order preparation to the maintenance terminal device 2 (Step S521), and ends the processing.

If it is determined in Step S519 that the repair work is unnecessary (S519: NO), the control unit 10 determines that the repair is completed, deletes the repair arrangement data from the storage unit 11 (Step S522), transmits an end screen including a message notifying of next repair work and order preparation to the maintenance terminal device 2 (S521), and ends the processing.

In a case where it is determined that the repair work is necessary in Step S519, the sequence of FIG. 10 is started by operation of a maintenance worker who visits the site again together with an arranged replacement member and the like.

When the end screen is transmitted, the maintenance terminal device 2 receives the end screen (Step S608), disconnects the communication connection with the maintenance support device 1 (Step S609), and ends the processing.

Figure 11:
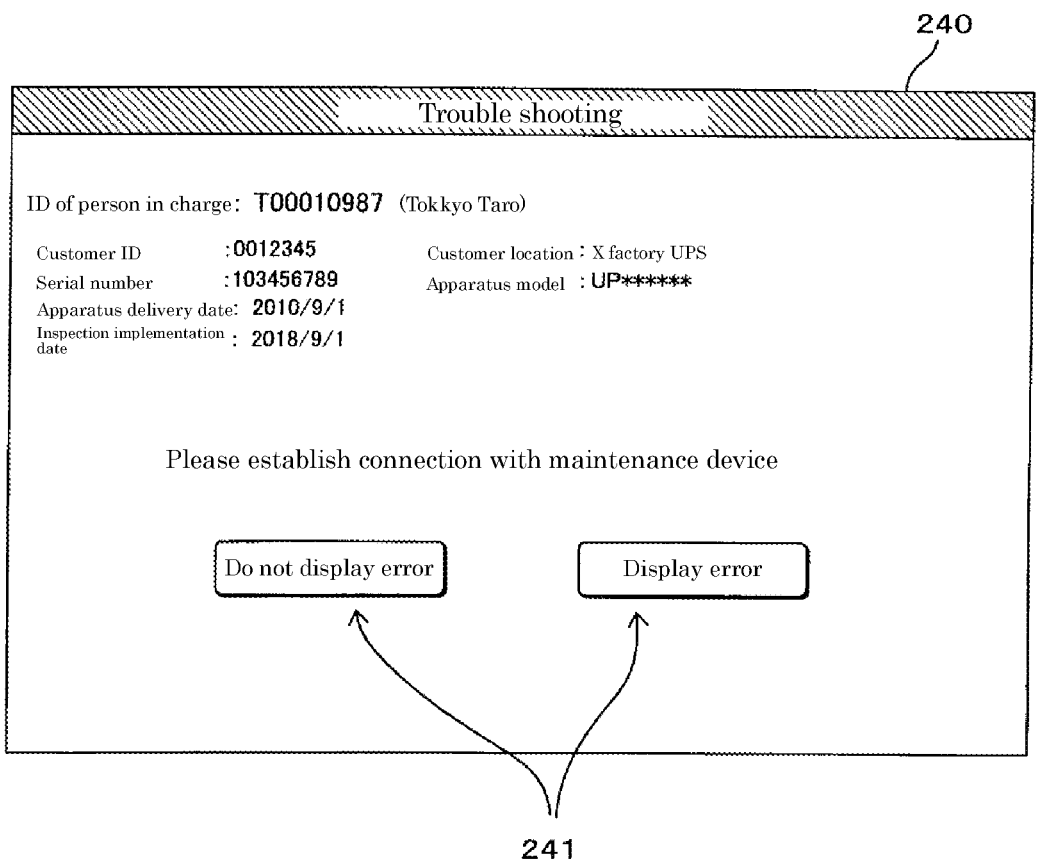
FIG. 11 illustrates a content example of a repair support screen displayed on a maintenance terminal device.

FIGS. 11 and 12 illustrate a content example of a repair support screen 240 displayed on the maintenance terminal device 2. As illustrated in FIG. 11, the repair support screen 240 includes a message indicating a repair procedure. On the repair support screen 240 in FIG. 11, a message prompting the user to check as to whether or not an error in the maintenance communication device 6 is displayed is displayed, and an interface 241 for receiving selection as to whether or not the error is displayed is displayed. When a maintenance worker selects one of the interfaces 241 using the operation unit 25, an operation result is transmitted to the maintenance support device 1 (S607), and the maintenance support device 1 further narrows down causes according to the operation result and identifies a next repair procedure (S514).

FIG. 12 illustrates an example of the repair support screen 240 including a next repair procedure displayed in a case where the interface 241 is selected on the repair support screen 240 illustrated in FIG. 11. FIG. 12 illustrates a procedure in a case where the interface 241 without error display is selected on the repair support screen 240 of FIG. 11. FIG. 12 includes a field for acquiring measurement data of the energy storage device 50 via the maintenance communication device 6 and inputting a result of the acquisition.

Figure 13:
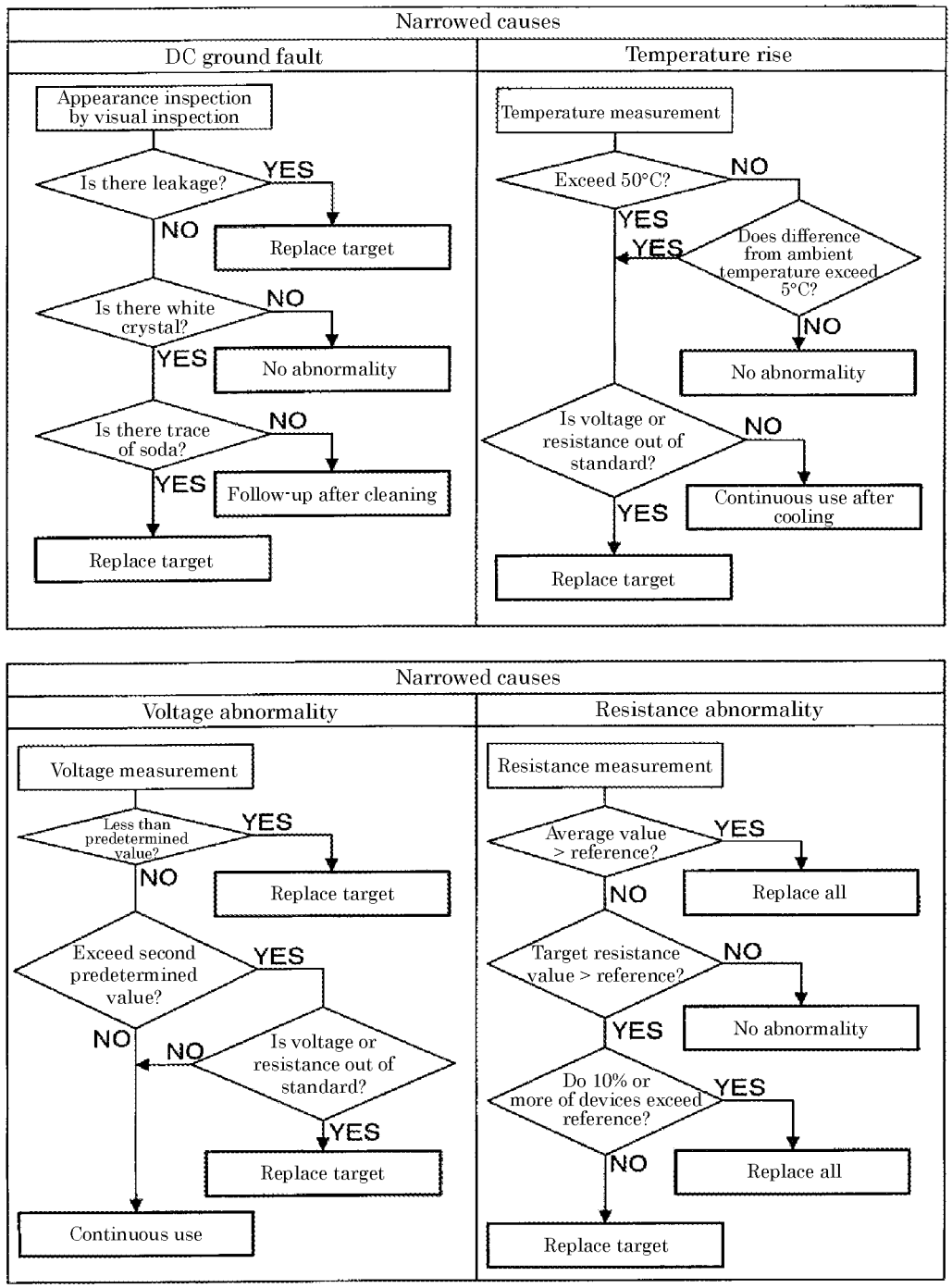
FIG. 13 is a diagram illustrating a content example of a repair process.

FIG. 13 is a diagram illustrating a content example of a repair process. As illustrated in FIG. 13, the storage unit 11 stores a repair process for each narrowed cause. FIG. 13 illustrates a content example a repair process stored according to causes of "DC ground fault", "temperature rise", "voltage abnormality", and "resistance abnormality". In the processing procedure illustrated in the flowchart of FIG. 10, in a case where the cause is narrowed down to, for example, "DC ground fault", the control unit 10 of maintenance support device 1 reads a repair process associated with identification information of the cause of "DC ground fault" in FIG. 13 (S513).

Figure 14:
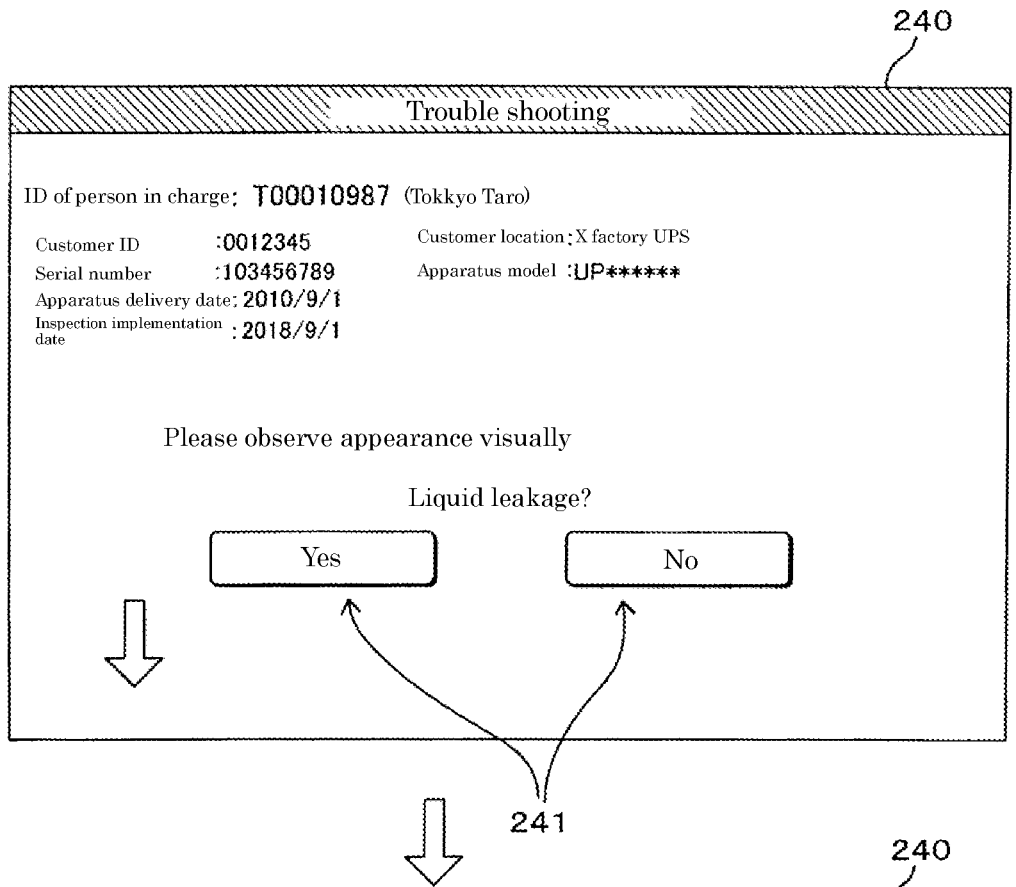
FIG. 14 illustrates another content example of the repair support screen.
Figure 14:
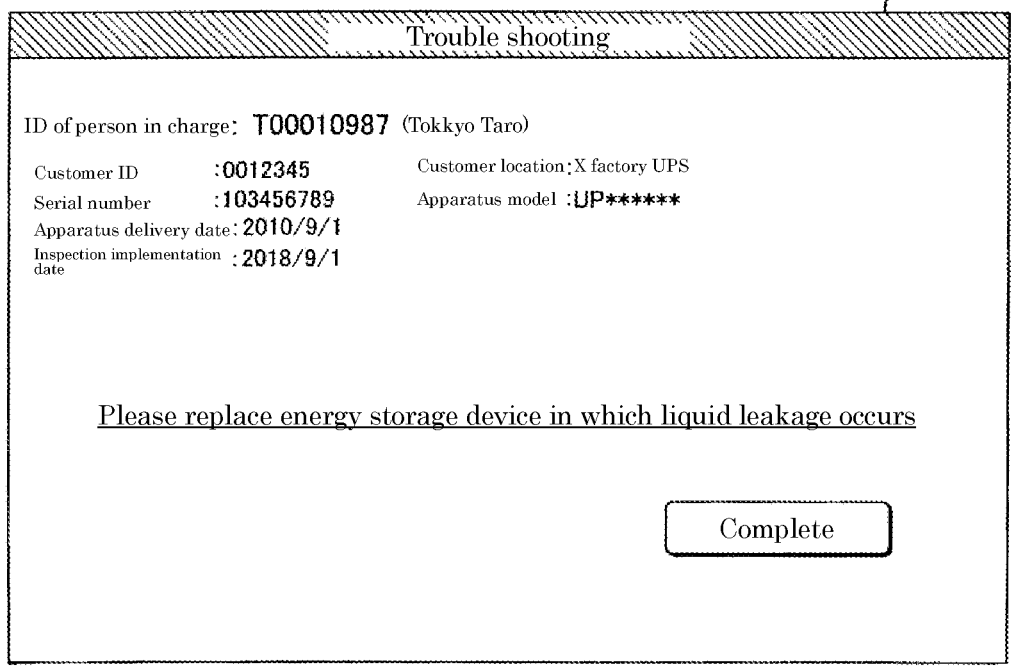
Figure 15:
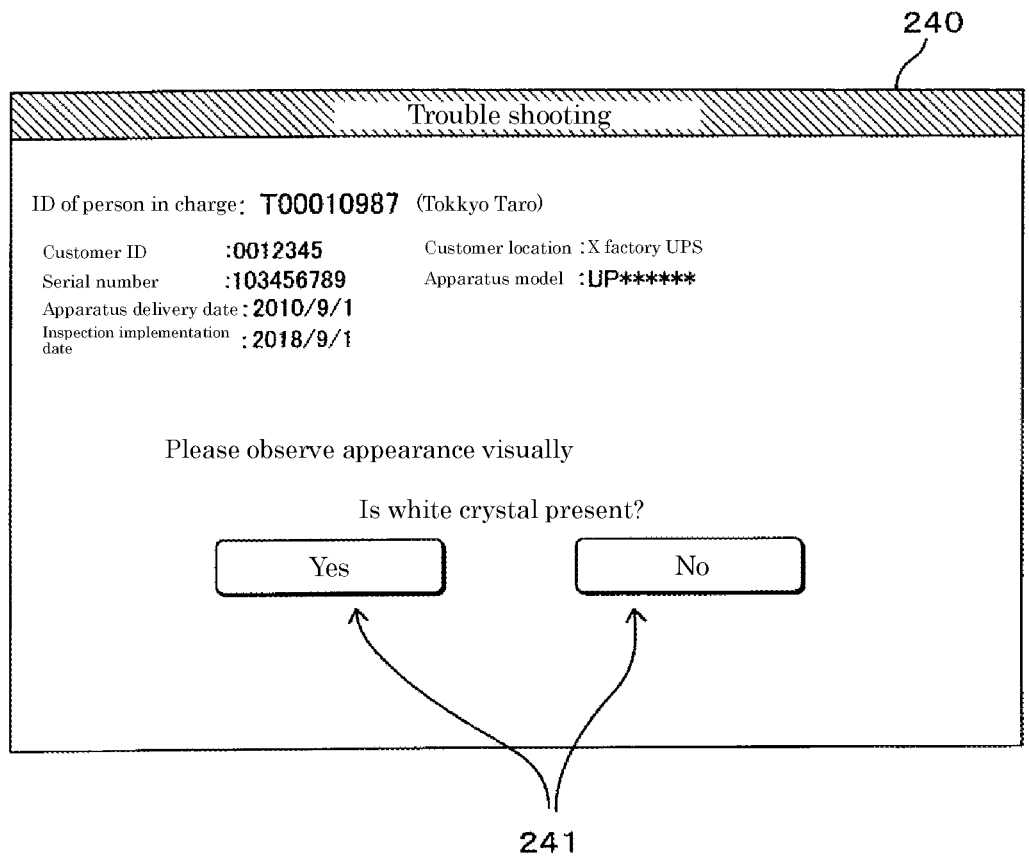
FIG. 15 illustrates another content example of the repair support screen.

In the case of "DC ground fault", the control unit 10 outputs the repair support screen 240 as described below. FIGS. 14 and 15 illustrate another content example of the repair support screen 240. The repair support screen 240 includes a message of "please observe the appearance visually" to prompt checking, and the interface 241 that receives selection of "Liquid leakage?/Yes/No". In a case where "Yes" is selected, an instruction message "please replace the energy storage device in which liquid leakage occurs" is output on the repair support screen 240. In a case where "No" is selected, a transition is made to the repair support screen 240 illustrated in FIG. 15. On the repair support screen 240 illustrated in FIG. 15, the interface 241 for receiving selection of "Is white crystal present?/Yes/No" is displayed. The control unit 10 repeats the processing of reading and outputting a procedure of the repair process until it is determined that the repair work is completed after an instruction such as "replacement", follow-up", or "continue using" corresponding to each option is reached in the repair process.

As described above, a repair procedure based on a repair process stored in advance as a best process according to a narrowed cause is displayed on the maintenance terminal device 2 based on the processing of the maintenance support device 1. In this manner, repair work is performed regardless of whether or not the worker is skilled. Repair work progresses quickly, and a necessary tool and the like are automatically arranged, so that improvement in efficiency of repair is also expected.

First Variation

A case where a repair process stored in the maintenance support device 1 of the above-described embodiment does not lead to identification of a cause of an abnormality or a sign of an abnormality is conceivable. For this reason, the maintenance support system 100 is configured to enable support of a skilled person, and can widely utilize knowledge of the skilled person about the energy storage device 50 for a rare case and the like. For example, a case where a repair procedure cannot be identified in Step S514 in the processing procedure illustrated in the sequence of FIG. 10 is assumed. In this case, the control unit 10 of the maintenance support device 1 advances the processing to Step S520, and executes arrangement of next repair work including securing a schedule of a skilled person. The arrangement includes notification of an e-mail or a message to a maintenance worker ranked as a skilled person by the control unit 10 of the maintenance support device 1. The arrangement includes notification to a manager of the maintenance worker by the control unit 10. In this case, the manager allocates skilled and unskilled maintenance workers to a site or the like.

Figure 16:
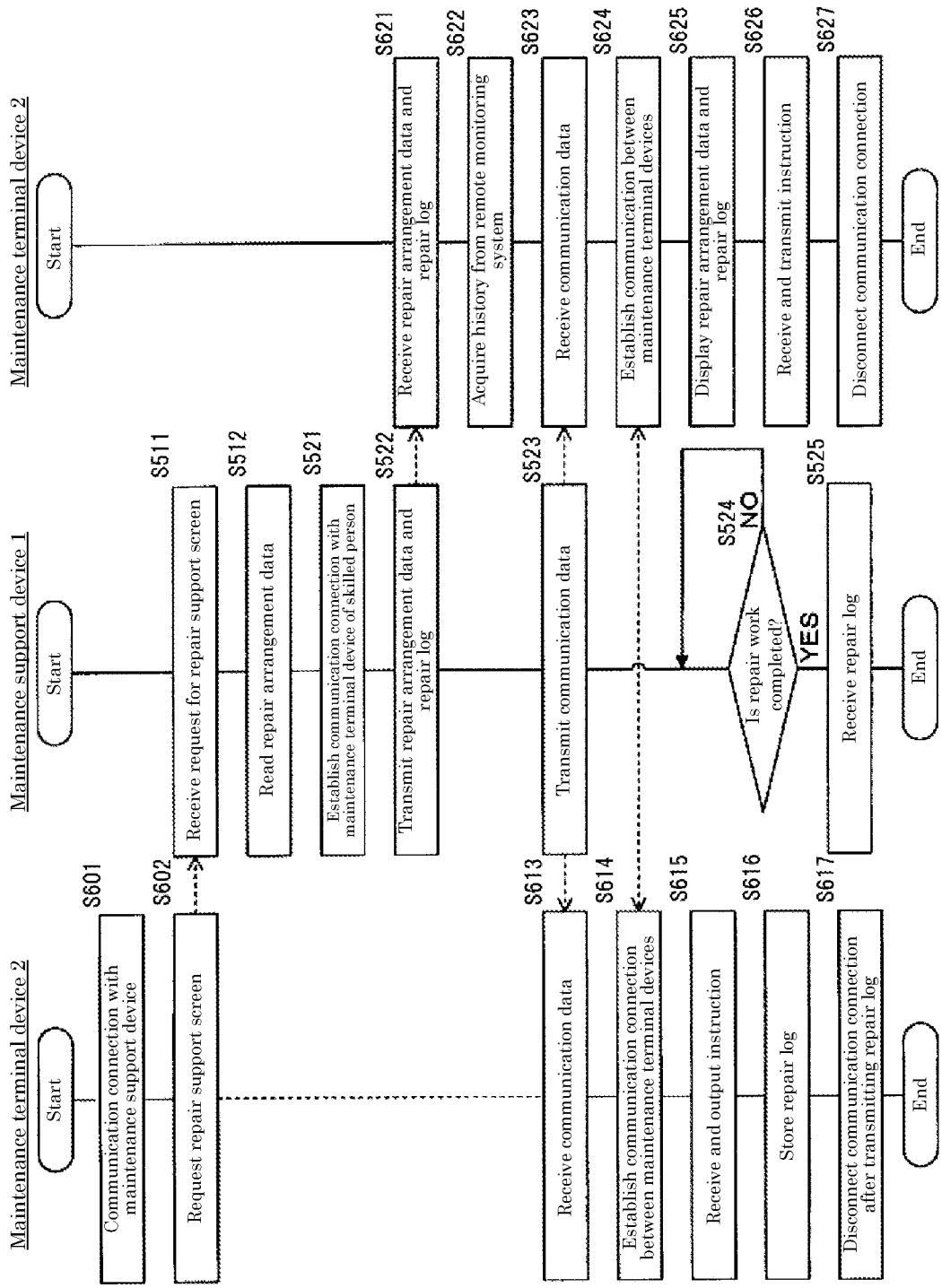
FIG. 16 shows a repair sequence by the maintenance support system in a first variation.

FIG. 16 shows a repair sequence by the maintenance support system 100 in a first variation. The processing procedure illustrated in FIG. 16 indicates a procedure of repair work performed on a date and time when a skilled person can remotely provide support. In the sequence of FIG. 16, a procedure common to the processing procedure illustrated in the sequence of FIG. 10 is denoted by the same step number, and omitted from detailed description.

When the maintenance support device 1 receives a request for the repair support screen (S511) and reads out the repair arrangement data (S512), the maintenance support device 1 also establishes communication connection with the maintenance terminal device 2 used by a skilled person (Step S521), and transmits repair arrangement data including identification data of the energy storage device 50 to be repaired and a repair log of repair already performed to the maintenance terminal device 2 of the skilled person (Step S522).

The control unit 10 of the maintenance support device 1 transmits communication data necessary for video call, chat, or the like between the maintenance terminal device 2 of a maintenance worker who actually performs repair work and the maintenance terminal device 2 of a skilled person to both of the devices (Step S523). The video call or the chat may be realized by a function included in the maintenance support system 100, that is, the maintenance terminal program 2P, or may be realized by a service outside the maintenance support system 100.

The maintenance terminal device 2 of the skilled person receives the repair arrangement data and the repair log (Step S621), and acquires a history of state data from the remote monitoring system 300 based on the identification data of the energy storage device 50 included in the repair arrangement data (Step S622).

The maintenance terminal device 2 of the skilled person and the maintenance terminal device 2 of the maintenance worker who performs repair work receive the communication data transmitted from the maintenance support device 1 (Steps S613 and S623), and establish communication connection to each other (Steps S614 and S624).

In the maintenance terminal device 2 of the skilled person, the control unit 20 displays the state data acquired in Step S622 and the repair arrangement data and the repair log received in Step S621 on the display unit 24 (Step S625). The control unit 20 receives and transmits instruction operation in accordance with exchange between the skilled person who performs operation and the maintenance worker (Step S626). When end operation is performed, the control unit 20 disconnects the communication connection (Step S627) and ends the processing.

In the maintenance terminal device 2 of the maintenance worker, when receiving the instruction, the control unit 20 outputs the instruction by the display unit 24 or the like (Step S615), and stores a log of repair work (Step S616). When the repair work is end by the exchange with the skilled person and the maintenance worker performs end operation, the control unit 20 transmits the repair log to the maintenance support device 1, then disconnects the communication connection between the maintenance support device 1 and the maintenance terminal device 2 of the skilled person (Step S617), and ends the processing.

The maintenance support device 1 determines whether or not the repair work is completed by the exchange between the maintenance terminal devices 2 (Step S524), and in a case where it is determined that the repair work is not completed (S524: NO), the maintenance support device 1 returns the processing to Step S524 and waits. The completion of the repair work may be determined by notification from the maintenance terminal device 2 of the maintenance worker who performs the repair work, or may be determined by another method.

In a case where it is determined in Step S524 that the repair work is completed (S524: YES), a repair log is received from the maintenance terminal device 2 of the maintenance worker who performs the repair work (Step S525), and the processing ends.

As described above, since the remote support by a skilled person is smoothly performed, uniform repair work is performed regardless of whether or not a repair worker is a skilled person.

Second Variation

In the embodiment described above, as described in Step S503 of the flowchart of FIG. 9, an abnormality or a sign of an abnormality detected by the maintenance support device 1 is narrowed down on the basis of the determination of whether a measured value included in state data is higher than the upper limit or lower than the lower limit of the normal range. This narrowing-down may be realized by machine learning including deep learning.

In the embodiment described above, a repair procedure to be executed next is identified based on the repair process stored in the storage unit 11. Alternatively, a repair procedure model in which a repair procedure by a skilled person is learned may be created, and a next repair procedure may be identified on the basis of the repair procedure model and transmitted to the maintenance terminal device 2.

Figure 17:
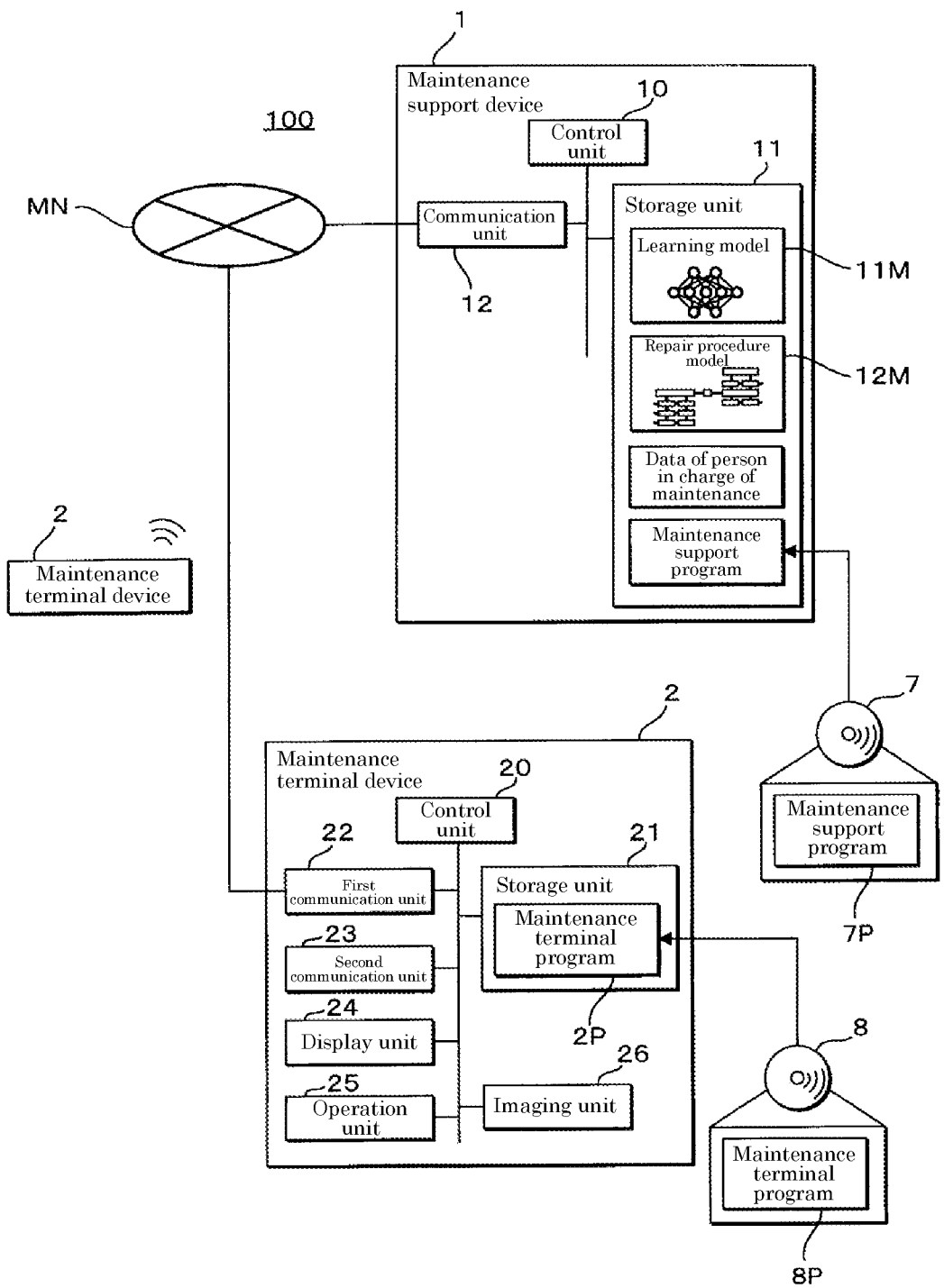
FIG. 17 is a block diagram illustrating a configuration of a maintenance support device according to a second variation.

FIG. 17 is a block diagram illustrating a configuration of the maintenance support device 1 according to a second variation. In the second variation, a learning model 11M and a repair procedure model 12M are stored in the storage unit 11 instead of a repair process.

The learning model 11M is used to identify a cause of the energy storage device 50 in which an abnormality or a sign of an abnormality is detected. For example, the learning model 11M is learned to output identification information of a cause together with accuracy in a case where state data in which an abnormality is detected is input using a neural network. The learning model 11M may be learned using state data in which a cause has already been identified.

The repair procedure model 12M is created on the basis of a long short-term memory (LSTM) model and a recurrent neural network (RNN) model, and is preferably learned to output a repair procedure to be performed next in an interactive manner each time a procedure for handling is input after an identified cause is first input. The repair procedure model 12M is preferably learned using a repair log in which a cause is identified and repair is completed, particularly a repair log by a skilled person.

As described above, by using the learning model 11M to which deep learning is applied, it is possible to accurately estimate a cause by utilizing a past repair record. Further, by presenting a repair procedure from the maintenance support device 1 using the repair procedure model 12M, uniform repair work regardless of whether or not the worker is a skilled worker is performed.

Third Embodiment

In the periodic inspection by a maintenance worker, a state check including a visual check is performed, and a report is prepared based on state data of the energy storage device acquired in the terminal device and the state check at an installation place. Time required for inspection work and preparation of the report varies depending on a skill level of a maintenance worker or an environment of the state check.

A maintenance support method detects inspection completion of an energy storage device by a maintenance worker, diagnoses a state of the energy storage device based on whether or not a value indicated by data acquired from a storage device, which sequentially stores measurement data relating to the energy storage device in association with identification data for identifying the energy storage device, is within a predetermined range after detection of the inspection completion, and creates report data including a result of the diagnosis.

With the above configuration, the report data is created based on a result of automatic diagnosis performed based on the measurement data stored in the storage device. The diagnosis is mechanically performed, by using measurement data at the time of an inspection acquired from the storage device that sequentially stores measurement data, based on whether or not a value indicated by the measurement data is within a predetermined range. Since the diagnosis is performed mechanically, content of the report is uniformed, and work required for report creation work by a maintenance worker is greatly reduced.

In maintenance support, since data acquisition is performed mechanically, work man-hours are small. In maintenance and inspection, it is difficult to reduce man-hours since there is an inspection item for which human work is essential, such as visual inspection by a maintenance worker. In view of the above, as a result of the inventors focusing on a point that the work man-hours of the entire maintenance and inspection can be reduced by improving the efficiency of the report creation, the above effect is obtained. It is desirable to periodically inspect the energy storage device. However, there is a concern that time and cost required for the inspection become a burden on an owner and the energy storage device is left without being inspected. As described above, since the report data is automatically created from the storage unit that sequentially stores the measurement data, it is possible to perform the inspection in which the work man-hours are greatly reduced. In this manner, time and cost required for the inspection can be reduced, and an environment in which the inspection can be easily performed is provided.

The report data may include information on a user of the energy storage device or information on the maintenance worker.

Any one of the information on the user who is an owner and an operator of the energy storage device, the information on the maintenance worker, and the like may be automatically included in the report data. The work of the maintenance worker is reduced by automatically complementing information which is a fact.

Approval of the maintenance worker may be received for the created report data.

In order to operate the energy storage device, it is necessary for a maintenance worker to visit an actual place of use and perform an inspection such as visual inspection of the appearance. By requiring approval by a maintenance worker who actually performs an inspection for a mechanical diagnosis result based on measurement data, reliability of the report is enhanced as compared with outputting only the mechanical diagnosis result based on the measurement data.

The predetermined range for measurement data used for the diagnosis of the energy storage device may be acquired from a manufacturing management system of the energy storage device or may be calculated from a history of measurement data stored in the storage device.

With the above configuration, it is possible to perform diagnosis according to a subtle difference in individual characteristics of the energy storage device so as not to be influenced by data of only a certain day, and accuracy of automatic diagnosis is enhanced.

The created report data may be stored in association with identification information of the user of the energy storage device and inspection date and time.

With the above configuration, in a case where the user desires to check a history of the maintenance and inspection, the user can browse the report data stored in association with the identification information of the user and the inspection date and time.

A maintenance support system includes: a storage device that periodically acquires and sequentially stores measurement data on an energy storage device; a maintenance terminal device that can be connected to the storage device; and a maintenance support device to which communication connection can be established from the maintenance terminal device. The maintenance terminal device notifies the maintenance support device of inspection completion by a maintenance worker for the energy storage device, and the maintenance support device notified about the inspection completion acquires diagnostic data obtained by diagnosing a state of the energy storage device depending on whether or not a value indicated by data acquired from the storage device is within a predetermined range corresponding to the energy storage device, and creates report data including a result of the diagnosis.

A maintenance support device includes a detection unit that detects inspection completion of an energy storage device by a maintenance worker, a diagnostic data acquisition unit that acquires diagnostic data obtained by diagnosing a state of the energy storage device based on whether or not a value indicated by data acquired from a storage device that sequentially stores measurement data relating to the energy storage device in association with identification data for identifying the energy storage device is within a predetermined range after detection of the inspection completion, and a report creation unit that creates report data including a result of the diagnosis.

A computer program causes a computer to execute processing of detecting inspection completion of an energy storage device by a maintenance worker, acquiring diagnostic data obtained by diagnosing a state of the energy storage device based on whether or not a value indicated by data acquired from a storage device that sequentially stores measurement data relating to the energy storage device in association with identification data for identifying the energy storage device is within a predetermined range after detection of the inspection completion, and creating report data including a result of the diagnosis.

A maintenance terminal device includes: a display unit that displays a screen including a maintenance procedure for an energy storage device; an acquisition unit that establishes communication connection with a storage device that periodically acquires and stores measurement data relating to the energy storage device and acquires the measurement data stored in the storage device; a notification unit that notifies a maintenance support device in a case where maintenance inspection of the energy storage device is completed; and a receiving unit that receives report data created by the maintenance support device from the maintenance support device. The maintenance terminal device causes the display unit to display a report based on received report data, and receives editing of the report.

A computer program causes a computer including a display unit to execute processing of causing the display unit to display a screen including a maintenance procedure for an energy storage device, establishing communication connection with a storage device that periodically acquires and stores measurement data relating to the energy storage device and acquiring the measurement data stored in the storage device, notifying a maintenance support device in a case where maintenance inspection of the energy storage device is completed, receiving report data created by the maintenance support device from the maintenance support device, causing the display unit to display a report based on received report data, and receiving editing of the report.

A computer used by a maintenance worker shows a maintenance and inspection procedure, and acquires the measurement data from the storage device to obtain a measurement result necessary for inspection. It is not necessary to perform measurement at the time of inspecting the energy storage device, and the maintenance worker only needs to take measurement data into the computer. For this reason, the inspection can be performed without depending on a skill level of the maintenance worker, and the efficiency is improved.

The maintenance support system 100 (see FIG. 1) according to the present embodiment automatically creates report data by using state data acquired from the energy storage apparatus 5, customer data obtained from the customer data management system 400, and diagnostic data obtained from the remote monitoring system 300 for maintenance/management of the energy storage device 50 or the energy storage apparatus 5. Work required for report creation work by a maintenance worker is greatly reduced by the report data that is automatically created. The report data is made uniform by the automatic creation, and improvement in uniformity and efficiency of maintenance and inspection can be achieved. For preventive maintenance of the energy storage device 50, it is necessary to perform inspection in which a maintenance worker actually views the energy storage device 50 or actually checks a use environment. A report is created based on report data approved by a maintenance worker who actually visits to perform inspection. In this manner, credibility of the report is maintained high.

The maintenance support system 100 according to the present embodiment supports maintenance/management of a group of the energy storage devices 50 as described below.

Figure 18:
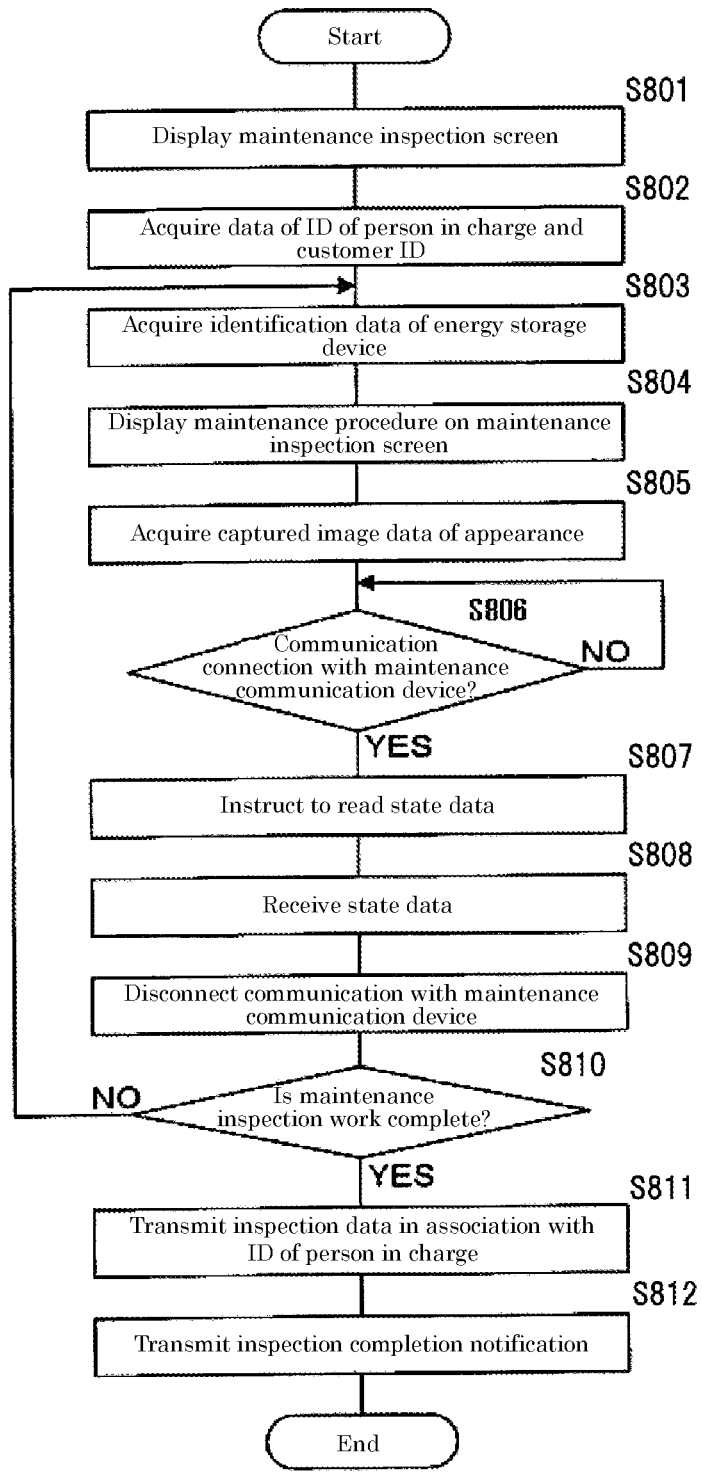
FIG. 18 is a sequence diagram illustrating an example of a processing procedure at the time of inspection in the maintenance terminal device.

FIG. 18 is a sequence diagram illustrating an example of a processing procedure at the time of inspection in the maintenance terminal device 2.

A maintenance worker carries the maintenance terminal device 2 and inspects the energy storage apparatus 5 and the energy storage devices 50 provided in the energy storage apparatus 5. Inspection content includes at least visual inspection of the appearance of the energy storage device 50 or capturing of an image, and acquisition of state data of the energy storage device 50 stored in a memory of the maintenance communication device 6.

The control unit 20 of the maintenance terminal device 2 displays a maintenance inspection screen based on the maintenance terminal program 2P (Step S801).

The maintenance inspection screen is displayed in a case where the maintenance worker selects a maintenance inspection menu on a main screen displayed on the display unit 24 by the processing of the maintenance terminal program 2P. The maintenance inspection screen includes a field for selecting or inputting data of a worker ID, a customer ID, and a serial number of the energy storage device 50. The maintenance inspection screen may be displayed on the basis of web screen data provided by a web server function of the maintenance support device 1 by a web browser function included in the maintenance terminal program 2P of the maintenance terminal device 2. However, since the maintenance terminal device 2 is not always be able to establish communication connection with the maintenance support device 1 via the communication network N, data of the maintenance inspection screen is preferably stored in the storage unit 21 of the maintenance terminal device 2 so that maintenance inspection can be performed even in a state where the communication connection cannot be established.

The control unit 20 acquires data of a worker ID and a customer ID (Step S802). In Step S202, the control unit 20 acquires data based on input operation using the operation unit 25 on an input field on the maintenance inspection screen. The control unit 20 may acquire the data of the customer ID from the maintenance communication device 6 in communication connection with the maintenance communication device 6 to be described later. The control unit 20 acquires identification data such as a serial number of the energy storage device 50 to be inspected delivered to a customer identified by the customer ID (Step S803). In Step S803, the control unit 20 acquires data from the input field of the maintenance inspection screen in the same manner as in S802.

The control unit 20 shows a maintenance procedure corresponding to the energy storage device 50 delivered to the customer identified by the customer ID on the maintenance inspection screen based on the maintenance terminal program 2P (Step S804). In Step S804, when acquiring the data of the customer ID and the serial number of the energy storage device 50, for example, the control unit 20 causes the imaging unit 26 to acquire a captured image and displays a message prompting connection on the maintenance inspection screen. A maintenance worker operates the imaging unit 26 to capture an image of the appearance of the energy storage device 50, and connects the maintenance terminal device 2 and the maintenance communication device 6 to each other by a USB cable.

The control unit 20 operates the imaging unit 26 to acquire captured image data (Step S805). In Step S805, instead of acquiring the captured image data, the control unit 20 may receive, on the maintenance inspection screen, input of information of visual inspection of the appearance by the operation unit 25.

The control unit 20 determines whether or not communication connection with the maintenance communication device 6 is possible by the second communication unit 23 (Step S806). In a case where it is determined that the communication connection is impossible (S806: NO), the control unit 20 returns the processing to Step S806 and waits.

When it is determined in Step S806 that the communication connection is possible (S806: YES), the control unit 20 transmits an instruction to read state data to the maintenance communication device 6 (Step S807). The control unit 20 receives the state data read by the maintenance communication device 6 (Step S808), and disconnects the communication by the second communication unit 23 (Step S809).

The control unit 20 determines whether or not the maintenance and inspection work of the maintenance worker on the energy storage device 50 for the customer identified by the customer ID is completed (Step S810). In a case where it is determined that the maintenance and inspection is not completed (S810: NO), the control unit 20 returns the processing to Step S803 and continues to show the maintenance procedure. For example, when the work progresses according to the procedure displayed on the maintenance inspection screen, an interface for selecting completion is displayed on the maintenance inspection screen, and when the maintenance worker selects this interface, it is determined in Step S810 that the work is completed.

In a case where it is determined in Step S810 that the maintenance and inspection is completed (S810: YES), the control unit 20 transmits inspection data to the remote monitoring system 300 in association with the worker ID (Step S811). The control unit 20 transmits an inspection completion notification to the maintenance support device 1 in association with the worker ID (Step S812), and ends the processing. The inspection data in Step S811 includes the state data received in Step S808 from each of the maintenance communication devices 6, the captured image data, and the identification data such as a serial number of the energy storage device 50. The inspection completion notification transmitted in Step S812 includes the identification data such as a serial number of the energy storage device 50.

The processing of Steps S811 and S812 is performed in a case where communication connection with the communication network N by the first communication unit 22 is possible. The transmission processing in Step S811 may be realized by establishing communication connection between the maintenance terminal device 2 and the remote monitoring system 300 and performing data communication, or may be realized by transmission of e-mail from the maintenance terminal device 2 or the like.

The notification processing in Step S812 may be realized by establishing communication connection between the maintenance terminal device 2 and the maintenance support device 1 and performing data communication, or may be realized by transmission of e-mail or the like from the maintenance terminal device 2.

In this manner, as illustrated in FIG. 1, state data of each of the energy storage devices 50 including information on the energy storage device 50 of the energy storage apparatus 5 which is not connected to the communication network N is collected in the remote monitoring system 300. In the processing procedure of the flowchart of FIG. 18, transmission of the state data to the remote monitoring system 300 in Step S811 is not essential in a case where state data collected by the customer management apparatus 51 is transmitted to the remote monitoring system 300.

As described above, the maintenance terminal device 2 shows the maintenance and inspection procedure, and state data of the energy storage device 50 does not need to be actually measured in an inspection target place, and may be taken from the maintenance communication device 6 to the maintenance terminal device 2 via a USB cable. The inspection can be completed by visual inspection or photographing of the appearance, observation, and data acquisition. Inspection can be performed without depending on a skill level of a maintenance worker, and efficiency is improved. It is possible to acquire state data of the same type as the state data transmitted to the management apparatus 51, and no discrepancy is generated between a measurement result at an inspection site and state data managed by a customer.

Figure 19:
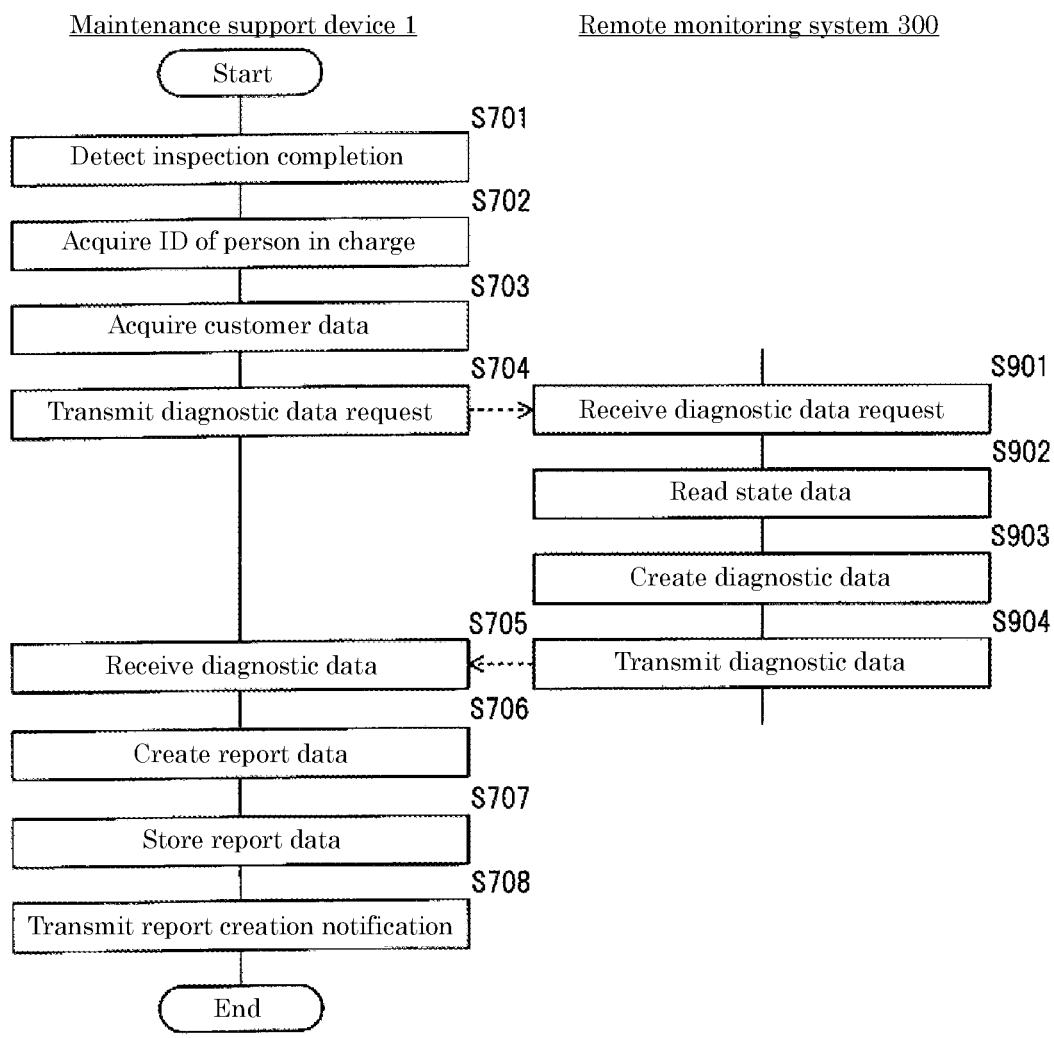
FIG. 19 illustrates an example of a procedure of report creation support processing in the maintenance support system by a sequence.

FIG. 19 illustrates an example of a procedure of report creation support processing in the maintenance support system 100 by a sequence. FIG. 19 illustrates processing between the maintenance support device 1 and the remote monitoring system 300.

In the maintenance support device 1, the control unit 10 detects inspection completion of the energy storage device 50 (Step S701). In Step S701, the control unit 10 preferably performs the detection by receiving the inspection completion notification (S812) from the maintenance terminal device 2 in association with the identification data such as a serial number of the energy storage device 50. In Step S701, the inspection completion on the energy storage device 50 to be inspected may be detected not only by direct receiving of the inspection completion notification, but also from the remote monitoring system 300 or the like.

The control unit 10 acquires a worker ID of the maintenance and inspection based on the identification data for the target energy storage device 50 for which inspection is completed (Step S702). The control unit 10 acquires customer data necessary for a report from the customer data management system 400 based on the identification data (Step S703). The customer data includes, for example, a customer ID, a customer name, a model of the energy storage device 50 or the energy storage apparatus 5, a delivery destination, and a delivery date.

The control unit 10 transmits a diagnostic data request for the energy storage device 50 identified by the identification data received in Step S701 to the remote monitoring system 300 (Step S704).

The remote monitoring system 300 receives the diagnostic data request including a serial number (Step S901), and reads state data of the energy storage device 50 identified by the serial number (Step S902). The state data to be read is latest data among pieces of state data that are most recently transmitted from an energy storage operation system managed by a customer, or state data that the maintenance terminal device 2 acquires from the maintenance communication device 6 and are transmitted and stored. The state data may be a history of state data over a predetermined period.

The remote monitoring system 300 creates diagnostic data based on the read state data in accordance with a procedure set by a manufacturer of the energy storage device 50 (Step S903). The remote monitoring system 300 transmits the created diagnostic data to a diagnostic data request source (Step S904).

The diagnostic data created in Step S903 includes, for each of the energy storage devices 50, for example, for each energy storage cell, a determination result as to whether or not a voltage value in the state data is included within a normal range corresponding to the target energy storage device 50, and a message based on the determination result.

The message includes the number of energy storage cells whose voltage values are included in the normal range, and in a case where the number of the energy storage cells is equal to or larger than a predetermined ratio of the total number of cells, the message may include that the operation is normal. The diagnostic data may include, without limitation to the determination result with respect to the voltage value, a determination result as to whether or not an internal resistance value is included in a normal range, and may include a determination result with respect to a current value or a temperature.

The diagnostic data created in Step S903 also reflects a result of visual inspection of the appearance at the time of inspection. In a case where a captured image is input, the remote monitoring system 300 recognizes the image of the energy storage device 50 shown in the captured image, determines whether or not an event such as swelling or liquid leakage occurs from the appearance of the energy storage device 50, and adds a determination result to the diagnostic data. The remote monitoring system 300 may output a determination result by a learning model that receives input of a finding in the visual inspection of the appearance or a captured image and outputs accuracy of occurrence of an event.

The maintenance support device 1 receives the diagnostic data from the remote monitoring system 300 by the communication unit 12 (Step S705). The control unit 10 of the maintenance support device 1 creates report data based on the worker ID acquired in Step S102, the customer data acquired in Step S703, and the diagnostic data received in Step S705 (Step S706).

The control unit 10 stores the created report data in the storage unit 11 in association with identification data such as a serial number of the energy storage device 50 (Step S707). In Step S707, the control unit 10 stores the data in the storage unit 11 in association with inspection date and time.

The control unit 10 transmits a notification of the report data to the maintenance terminal device 2 (Step S708), and ends the creation processing of the report data. The transmission of the notification in Step S708 may be realized by e-mail, a short message, or a push notification function in the maintenance terminal program 2P to a maintenance worker.

Among pieces of the processing in Steps S901 to S904 by the remote monitoring system 300, the diagnostic data creation in Step S903 may be performed by receiving the state data in the maintenance support device 1 and performing the processing of the control unit 10.

Figure 20:
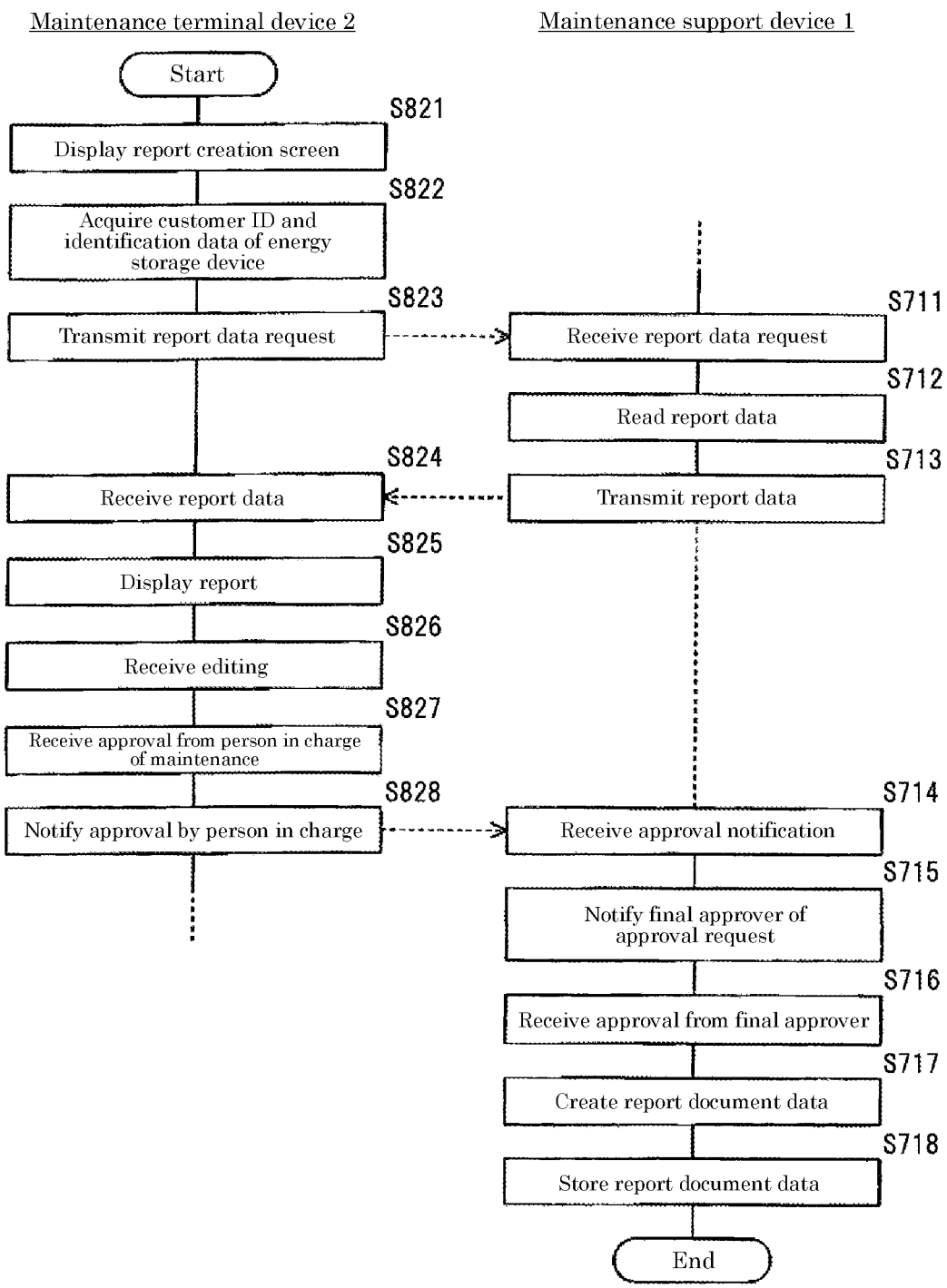
FIG. 20 is a sequence diagram illustrating an example of a report creation processing procedure.

FIG. 20 is a sequence diagram illustrating an example of a report creation processing procedure. When a maintenance worker finishes inspection in a predetermined procedure, the maintenance worker creates a report. The report is created when the maintenance worker returns from the inspection to an office of a manufacturer. Processing below is started in a case where the maintenance worker selects a report creation menu on a main screen displayed on the display unit 24 by the processing of the maintenance terminal program 2P upon receiving the notification in Step S708 in FIG. 19.

The control unit 20 of the maintenance terminal device 2 displays a report creation screen based on the maintenance terminal program 2P (Step S821). The report creation screen may be displayed on the basis of web screen data provided by a web server function of the maintenance support device 1 by a web browser function included in the maintenance terminal program 2P of the maintenance terminal device 2. The report creation screen includes a field for selecting or inputting information on a customer ID and a serial number of the energy storage device 50.

The control unit 20 acquires a customer ID and identification data such as a serial number of the energy storage device 50 on the report creation screen (Step S822). In Step S822, the control unit 20 may acquire a worker ID of a worker who operates the maintenance terminal device 2, and receive selection from a list of customer IDs and serial numbers corresponding to inspections which are performed by the worker identified by the acquired worker ID and for which the report creation is not completed.

The control unit 20 transmits a report data request including the customer ID and the identification data of the energy storage device 50 acquired in Step S822 to the maintenance support device 1 (Step S823).

The control unit 10 of the maintenance support device 1 receives the report data request (Step S711), and reads latest report data among pieces of report data stored in the storage unit 11 according to the identification data included in the report data request (Step S712). The control unit 10 transmits the read report data to the maintenance terminal device 2 of a report data request source (Step S713). The transmission in Step S713 is performed, for example, by being attached to the report creation screen.

The control unit 20 of the maintenance terminal device 2 receives the report data transmitted in response to the report data request by the first communication unit 22 (Step S824), and displays the report data as a report on the report creation screen (Step S825). In Step S825, the report may be displayed in a predetermined report format, or may be displayed as a list for each item to be described in the report.

The control unit 20 receives editing of the displayed report by the operation unit 25 (Step S826). The report creation screen includes an editing receiving interface and an editing approval interface for the report displayed in Step S825. In a case where the editing receiving interface is selected, the control unit 20 can receive editing of the report on the report creation screen. An editable item is, for example, a message based on a determination result included in the diagnostic data, and can be additionally written.

The control unit 20 receives approval for the report from a maintenance worker by the operation unit 25 (Step S827). When the approval is received, the control unit 20 transmits an approval notification by the worker to the maintenance support device 1 including the report data approved by the worker in association with the worker ID (Step S828). To the approval in Steps S827 and S828, an electronic approval operated in the network MN of a manufacturer may be applied.

The control unit 10 of the maintenance support device 1 receives the approval notification (Step S714), and notifies a final approver of an approval request for the report data approved by the worker included in the approval notification of Step S714 based on the worker ID associated with the approval notification (Step S715). The notification to the final approver may be transmitted by e-mail or the like.

When receiving the approval from the final approver for the approval request notified in Step S715 (Step S716), the control unit 10 creates document data of a report from the approved report data (Step S717). The control unit 10 stores the created document data of a report in the storage unit 11 in association with the customer ID, the inspection date and time, and the approval date and time (Step S718), and ends the processing.

In a case where the approval is not received in Step S716, the control unit 10 of the maintenance support device 1 may request the worker indicated by the worker ID for reediting or the like.

The document data in Step S717 may be output as, for example, pdf data or may be printed out. The created document data is utilized by a sales representative to report to the customer. After the processing of Step S718, the control unit 10 may notify the sales representative that the approved report document data is created. The notification is preferably transmitted by e-mail or the like, and the e-mail preferably includes a link to the document data of a report.

The document data of a report stored in the storage unit 11 for each customer and each piece of identification data of the energy storage device 50 in association with the inspection date and time may be browsable from a computer used by a customer based on a function of a web server of the maintenance support device 1. The control unit 10 of the maintenance support device 1 may transmit only the document data associated with a customer ID via the communication network N or the dedicated line N2 in response to a browsing request from the management apparatus 51 or a terminal device limited by a password or the like.

The creation processing of the diagnostic data illustrated in FIG. 19 may be executed at a timing at which the report data is read after the maintenance worker starts the report creation and the maintenance support device 1 receives the report data request (S711) as illustrated in FIG. 20.

Figure 21:
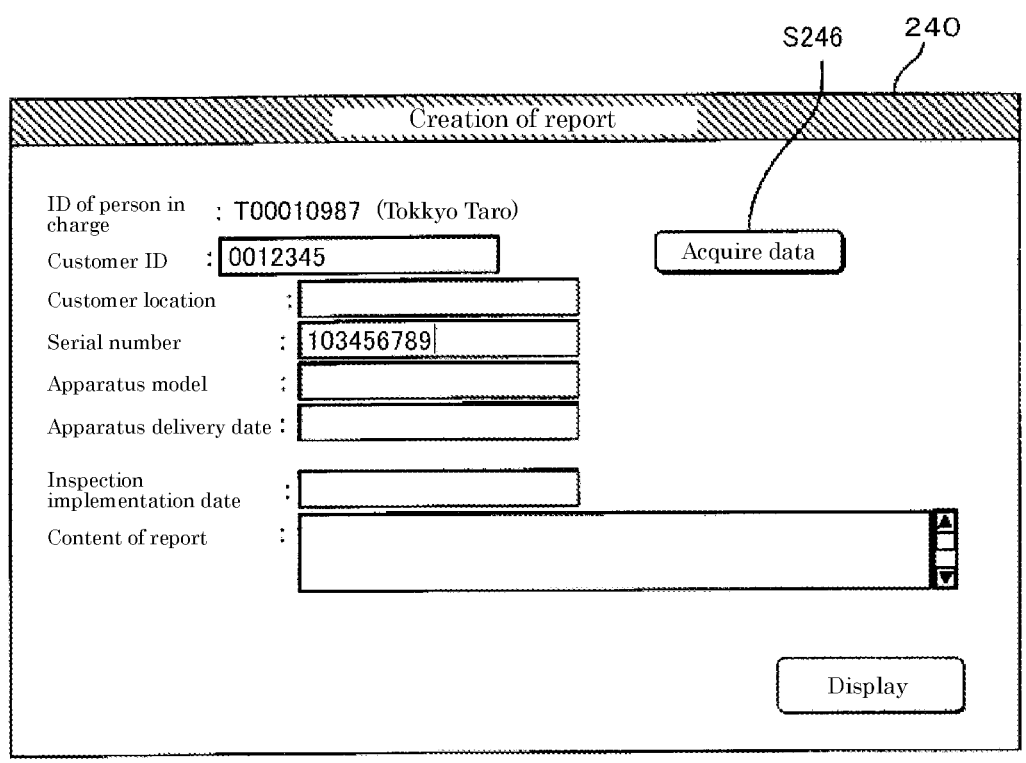
FIG. 21 illustrates an example of a report creation screen displayed on the maintenance terminal device.
Figure 22:
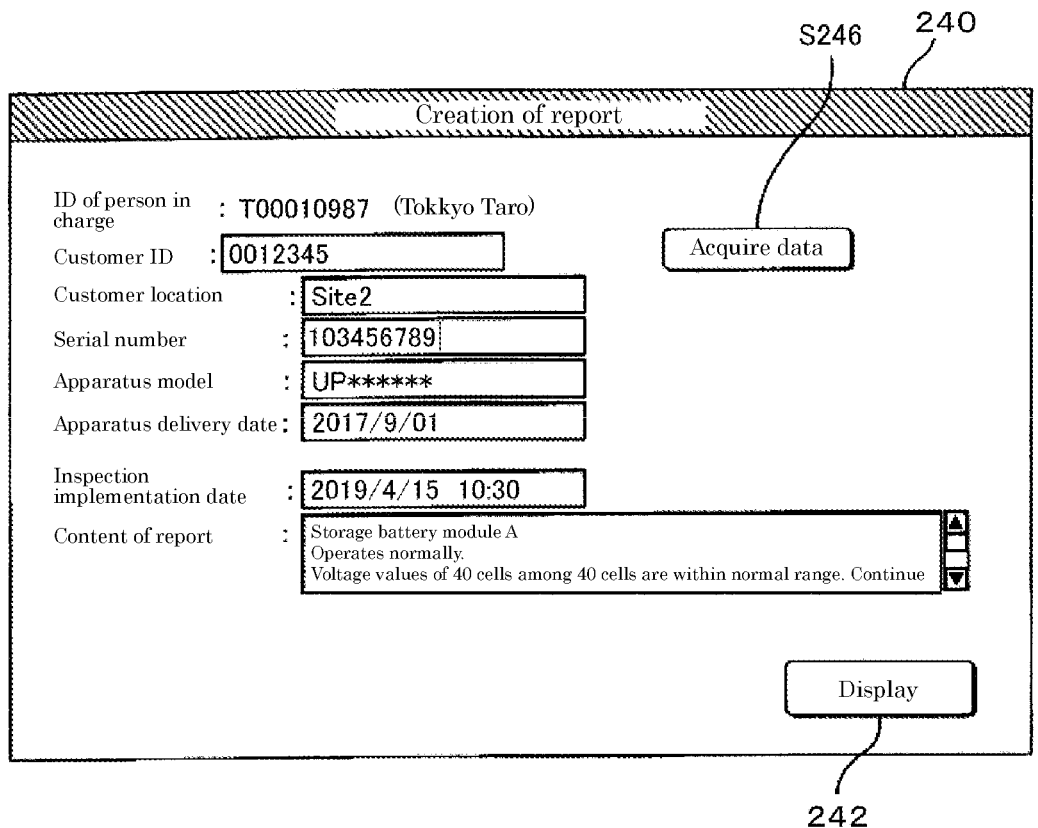
FIG. 22 illustrates an example of the report creation screen displayed on the maintenance terminal device.
Figure 23:
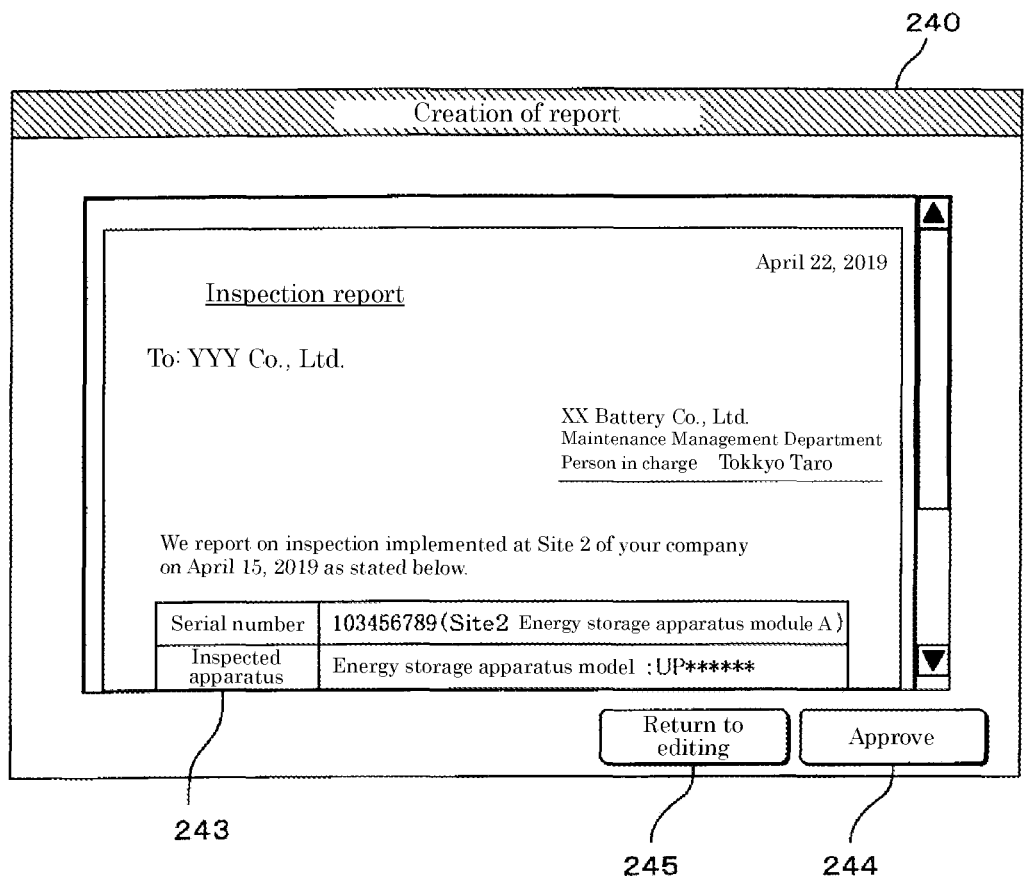
FIG. 23 illustrates an example of the report creation screen displayed on the maintenance terminal device.

FIGS. 21 to 23 illustrate examples of a report creation screen 240 displayed on the maintenance terminal device 2. In the report creation screen 240 of FIG. 21, a worker ID is displayed together with a worker name based on content input when the maintenance terminal program 2P is activated using the maintenance terminal device 2. In FIG. 21, a place where the energy storage device 50 is installed, an inspection date, and report content other than a customer ID and the identification data (serial number) of the energy storage device 50, which are required to be input on the report creation screen 240, are blank. The report creation screen 240 includes a data acquisition interface 246. When a customer ID and a serial number of the energy storage device 50 are input and the data acquisition interface 246 is selected by the operation unit 25, the processing of Step S823 in FIG. 20 is executed, and a request for report data is transmitted to the maintenance support device 1.

FIG. 22 illustrates a state in which report data is reflected on the report creation screen 240. As shown in FIG. 22, report data automatically created by the maintenance support device 1 is acquired based on a customer ID and identification data of the energy storage device 50. When necessary report data is acquired, a report display interface 242 on the report creation screen 240 is enabled and selectable. FIG. 22 illustrates an example in which a list for each item to be described in a report is displayed in Step S825 in FIG. 20. On the report creation screen 240 in FIG. 22, the editing in Step S826 in FIG. 20 can be received.

FIG. 23 is a display example of a report. FIG. 23 is an example of display in a case where the display interface 242 is selected in FIG. 22. FIG. 23 illustrates an example of display in a format of the report in Step S225 in FIG. 20. As illustrated in FIG. 23, the report creation screen 240 includes a preview screen 243, an approval interface 244, and an interface 245 for editing, that is, returning to the screen illustrated in FIG. 22. In a case where the approval interface 244 is selected, the approval in Step S827 in FIG. 20 is received.

In this way, since most of a report formatted by the maintenance support device 1 is created, the work required for the report creation work of a maintenance worker is greatly reduced. Since a diagnosis result included in the report data is automatically created, the report is also uniformed. Since the approval is created based on a required process, the credibility is also maintained high.

Variation

In FIG. 19, the remote monitoring system 300 performs diagnosis based on whether or not state data is included in a predetermined range, and creates a diagnosis result as diagnostic data. The predetermined range may vary depending on a manufacturing lot of the energy storage device 50 identified by a serial number, a manufacturing date and time, and the like. In a variation, a result of determination using a range of each of the individual energy storage devices 50 instead of the same range for each of a plurality of the energy storage devices 50 is acquired.

Figure 24:
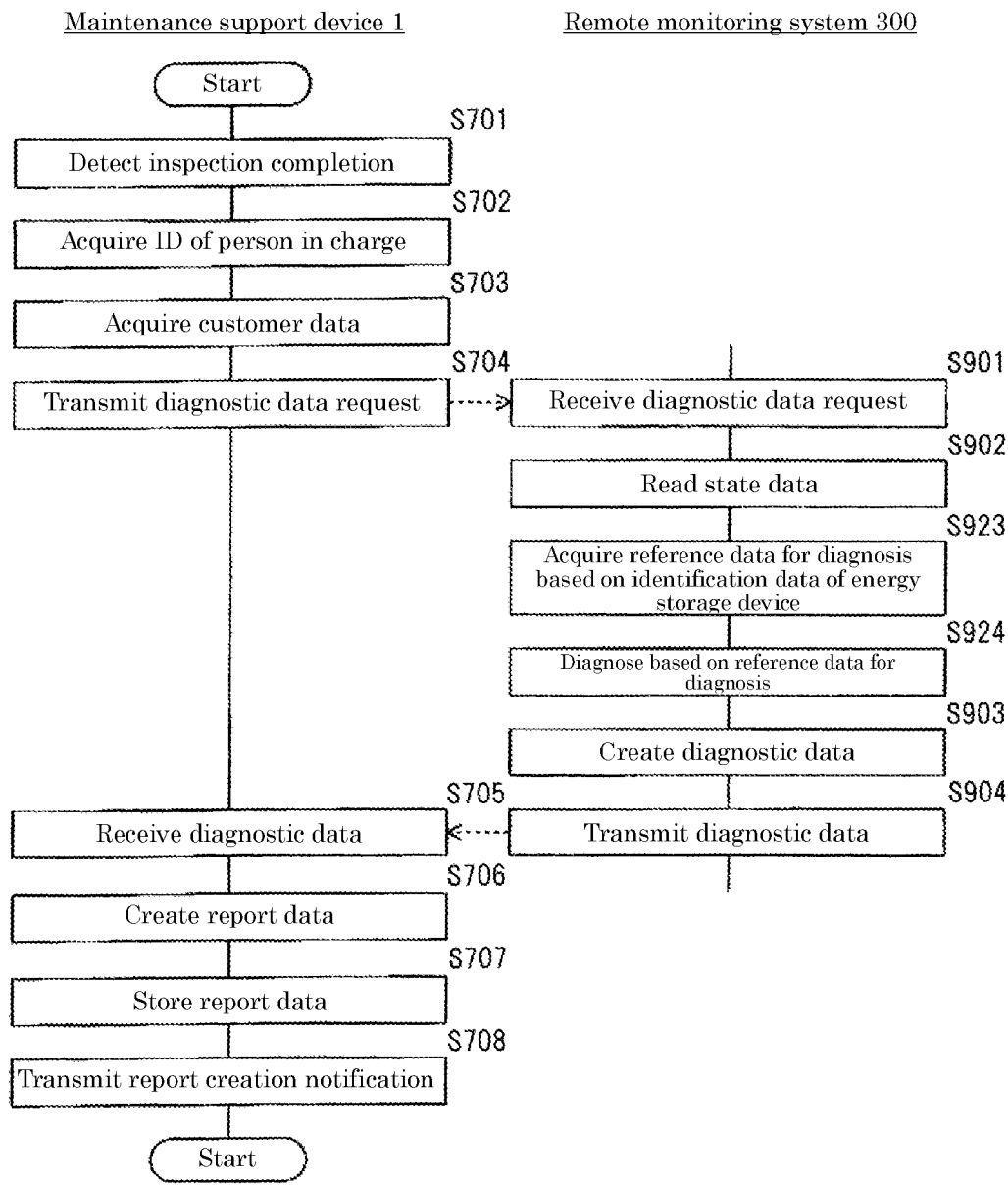
FIG. 24 illustrates an example of a procedure of the report creation support processing in the maintenance support system in a variation.

FIG. 24 illustrates an example of a procedure of the report creation support processing in the maintenance support system 100 in a variation. In the processing procedure illustrated in FIG. 24, a procedure common to the processing procedure illustrated in FIG. 19 is denoted by the same step number, and omitted from detailed description.

In the variation, when the remote monitoring system 300 reads state data on the energy storage device 50 which is a diagnostic data request target (S902), data to be referred to for diagnosis is acquired based on identification data such as a serial number of the energy storage device 50 (Step S923). The data referred to for diagnosis is data indicating a normal range with respect to a measurement value included in state data of each of the energy storage devices 50. The data indicating the normal range is stored in a manufacturing management system in Step S923 or calculated by the remote monitoring system 300 itself.

The remote monitoring system 300 performs diagnosis based on reference data for diagnosis acquired for each of the energy storage devices 50 (Step S924). In Step S924, for example, it is determined whether or not a voltage value in state data is included within the normal range of the diagnostic reference data for the target energy storage device 50.

The remote monitoring system 300 creates diagnostic data by diagnosis based on the diagnostic reference data for each of the energy storage devices 50 (S903), and transmits the diagnostic data to the maintenance support device 1 (S904). The processing of Step S923 and Step S924 may be executed by the maintenance support device 1.

The embodiments disclosed as described above are illustrative in all respects and are not restrictive. The scope of the present invention is defined by the claims, and includes meanings equivalent to the claims and all changes within the scope.

The invention claimed is:
1. A maintenance support method comprising:
aggregating measurement data relating to an energy storage device, the measurement data being acquired from a storage device, which sequentially stores the measurement data in association with identification data for identifying the energy storage device;
diagnosing a state of the energy storage device based on whether or not a value indicated by the aggregated measurement data is within a predetermined range;
generating report data including a result of the diagnosis, the result being based on the sequential measurement data of the energy storage device, even when the value is within the predetermined range; and
in response to the value exceeding the predetermined range, adjust timing of maintenance of the energy storage device to prevent an abnormality.

2. The maintenance support method according to claim 1, further comprising:
receiving approval for the created report data.

3. The maintenance support method according to claim 1, wherein the report data includes information on a user of the energy storage device.

4. The maintenance support method according to claim 1, wherein the predetermined range for measurement data used for the diagnosis of the energy storage device is acquired from a manufacturing management system of the energy storage device or is calculated from a history of measurement data stored in the storage device.

5. The maintenance support method according to claim 1, wherein the created report data is stored in association with identification information of a user of the energy storage device and inspection date and time.

6. A maintenance support system comprising:
an acquisition unit that establishes communication connection with a storage device that sequentially and periodically acquires and stores measurement data relating to the energy storage device, the measurement data being stored in association with identification data for identifying the energy storage device, wherein the acquisition unit further aggregates the measurement data sequentially and periodically acquired and stored in the storage device;
a monitoring unit that diagnoses a state of the energy storage device based on whether or not a value indicated by the aggregated measurement data is within a predetermined range; and
a notification unit that generates report data including a result of the diagnosis, the result being based on the sequential measurement data of the energy storage device, even when the value is within the predetermined range and, in response to the value exceeding the predetermined range, notifies a maintenance support device of an adjusted timing of maintenance of the energy storage device to prevent an abnormality.

7. A computer program causes a computer to execute processing of:
establishing communication connection with a storage device that sequentially and periodically acquires and stores measurement data relating to the energy storage device and aggregating the acquired measurement data in association with identification data for identifying the energy storage device;
determining a state of the energy storage device based on whether or not a value indicated by the aggregated measurement data is within a predetermined range;
generating report data including a result of the diagnostic determination, the result being based on the sequential measurement data of the energy storage device, even when the value is within the predetermined range; and
in response to the value exceeding the predetermined range, adjusting timing of maintenance of the energy storage device to prevent an abnormality and notifying a maintenance support device of the adjusted timing.

* * * * *